US012644808B2

(12) United States Patent
Göring et al.

(10) Patent No.: US 12,644,808 B2
(45) Date of Patent: Jun. 2, 2026

(54) METHOD FOR THERMOMECHANICALLY TESTING A TEST OBJECT, AND TESTING DEVICE FOR SAME

(71) Applicant: AMTAS GMBH, Cologne (DE)

(72) Inventors: Jürgen Göring, Cologne (DE); Maximilian Pütz, Troisdorf (DE); Mathias Kunz, Rottenburg (DE)

(73) Assignee: AMTAS GMBH, Cologne (DE)

( * ) Notice: Subject to any disclaimer, the term of this patent is extended or adjusted under 35 U.S.C. 154(b) by 0 days.

(21) Appl. No.: 18/868,465

(22) PCT Filed: May 23, 2023

(86) PCT No.: PCT/EP2023/063831
§ 371 (c)(1),
(2) Date: Nov. 22, 2024

(87) PCT Pub. No.: WO2023/227623
PCT Pub. Date: Nov. 30, 2023

(65) Prior Publication Data
US 2025/0172469 A1　　May 29, 2025

(30) Foreign Application Priority Data

May 23, 2022　(DE) .................... 10 2022 112 962.4
Aug. 17, 2022　(DE) .................... 10 2022 120 768.4

(51) Int. Cl.
*G01N 3/08*　　(2006.01)
*G01N 3/06*　　(2006.01)
*G01N 25/00*　　(2006.01)

(52) U.S. Cl.
CPC ............... *G01N 3/08* (2013.01); *G01N 3/068* (2013.01); *G01N 25/00* (2013.01); *G01N 2203/0226* (2013.01)

(58) Field of Classification Search
None
See application file for complete search history.

(56) References Cited

U.S. PATENT DOCUMENTS 3,908,440 A　　9/1975　Houser
7,966,868 B1　　6/2011　Sonnichsen et al.
(Continued)

FOREIGN PATENT DOCUMENTS

CN　　208505806 U　　2/2019
CN　　111024750 A　　4/2020
(Continued)

OTHER PUBLICATIONS

International Preliminary Report on Patentability for Application No. PCT/EP2023/063831, dated Mar. 15, 2024, 4 pages, English translation.
(Continued)

*Primary Examiner* — Erica S Lin
(74) *Attorney, Agent, or Firm* — CANTOR COLBURN LLP

(57) ABSTRACT
A method for thermomechanical testing of a test specimen, characterized in that the test specimen is subjected to a high-speed thermal mass flow and a force acting on the test specimen as a result of the exposure is continuously determined by a determination device and a force-time curve is determined therefrom. A test device for thermomechanical testing of a test specimen is also related.

15 Claims, 9 Drawing Sheets

(56) References Cited

U.S. PATENT DOCUMENTS

2009/0061131 A1 * 3/2009 Monfalcone, III .... D21H 21/34
                                                      2/81
2015/0360208 A1 * 12/2015 König ..................... B01J 35/19
                                                     423/213.2
2019/0212283 A1 * 7/2019 Esfandabadi .......... G01N 25/50

FOREIGN PATENT DOCUMENTS

| CN | 111562189 A | 8/2020 |
| CN | 112034004 A | 12/2020 |
| DE | 1446965 C1 | 9/1971 |
| DE | 2435999 A1 | 2/1976 |
| DE | 102011051790 A1 | 1/2013 |
| DE | 102019132910 A1 | 6/2021 |
| DE | 102020118072 A1 | 1/2022 |
| DE | 102020118072 B4 | 4/2022 |

OTHER PUBLICATIONS

International Search Report for Application No. PCT/EP2023/063831, dated Sep. 19, 2023, 4 pages, English translation.
Written Opinion for Application No. PCT/EP2023/063831, dated Sep. 19, 2023, 4 pages, English translation.
Korean Office Action for Application No. 10-2024-7039500, dated Sep. 7, 2025, 8 pages.

* cited by examiner

1

METHOD FOR THERMOMECHANICALLY TESTING A TEST OBJECT, AND TESTING DEVICE FOR SAME

CROSS-REFERENCE TO RELATED APPLICATIONS

This application is a 35 U.S.C. § 371 National Stage patent application of PCT/EP2023/063831 filed 23 May 2023, which claims the benefit of German patent application 10 2022 112 962.4 filed 23 May 2022, and which claims the benefit of German patent application 10 2022 120 768.4 filed 17 Aug. 2022, the disclosures of which are incorporated herein by reference in their entirety.

TECHNICAL FIELD

The present disclosure provides a method for thermomechanically testing a test specimen according to the first independent claim. Another object of the present disclosure is a test device for thermomechanically testing a test specimen according to the second independent claim.

BACKGROUND

A fire protection shield must have a sufficiently high burn-through resistance, in particular a burn-through resistance over time, as well as shield the heat of the fire. For example, in the case of shielding an accumulator of an electric motor-driven motor vehicle from a passenger compartment of this vehicle. This should be designed in such a way that a fire in the battery does not penetrate directly into the passenger compartment, but allows the passengers to stop the vehicle safely and leave it or be rescued within a period of time specified by test regulations. Other applications for such shielding include fire protection shielding systems in buildings, on ships or in airplanes. It is therefore necessary to select or develop materials with appropriate properties for such shielding that have a sufficiently high burn-through resistance over time. For this purpose, it is necessary to test the intended materials as a function of the acting energy and material flows ("action characteristics"). In the context of the present disclosure, this is referred to as "thermomechanical testing".

It is known from the state of the art to test the intended materials in a realistic arrangement using real means. The extent to which the fire protection shielding is damaged is determined by human observation of the test specimen. The disadvantage of this solution, which is known from the state of the art, is that it allows only a very imprecise determination of the resistance and its dependence on the exposure characteristics. This is due to the fact that there is variability in terms of energy and material flow. Furthermore, the repeatability is only very inadequate, so that no objective test procedure for testing a test specimen is possible with such arrangements.

DE 24 35 999 A1 discloses a method and a test device for testing thermoplastics in which a test specimen is exposed to a bundled jet of hot gas.

U.S. Pat. No. 3,908,440 A discloses a device and a method for applying a high-speed thermal mass flow to a test specimen, whereby the test specimen is clamped on one side and has a free end. The test specimen is subjected to the mass flow on both sides, whereby the test specimen is provided with a ground piece at its free end. A measuring scale is used to determine the deformation (deflection) of the test specimen caused by the thermal load.

Furthermore, U.S. Pat. No. 7,966,868 B1 describes a device and a method for subjecting a test specimen to a thermal high-speed mass flow for testing gas turbines and their components.

CN 111 562 189 A describes a test device with an adjustable impingement means for providing a high-speed mass flow, whereby the impingement means is directed onto a test specimen which is held in a holder. The jet of the impact means flows through a Laval nozzle.

DE 14 46 965 C discloses a device and a method for simulating the pressure and temperature of an explosion.

Furthermore, DE 10 2020 118 072 A1 discloses a test device for testing test specimens for their resistance to particle impact and high temperatures, which are provided by means of a propellant charge. The test specimens are a battery for an electrically powered vehicle.

CN 111 024 750 A describes a device and a method for ablation testing of ceramic matrix composites with a controllable gas atmosphere.

SUMMARY

It is therefore a task of the present disclosure to specify a method for thermomechanical testing of a test specimen which ensures increased repeatability. Furthermore, it is a task to specify a test device for thermomechanical testing of a test specimen which provides repeatability and has a compact design.

The problem is solved by a method with the features of the first independent claim and a test device with the features of the second independent claim.

The subclaims each relate to preferred embodiments or further embodiments of the present disclosure, the respective features of which can be freely combined with one another within the scope of what is technically expedient, if necessary also beyond the category limits of the various claims.

A method according to the disclosure is a method for thermomechanical testing of a test specimen, whereby the test specimen is subjected to a high-speed thermal mass flow, wherein a force acting on the test specimen as a result of the application is continuously determined by means of the determining device and a force-time curve is determined therefrom.

Thanks to the method according to the disclosure, precise fire protection testing of the test specimen can be realized without the expense of a real arrangement. This means that test specimens can be tested more quickly and cost-effectively before their material is used for fire protection shielding, or an appropriate preselection can be made from a large number of materials before further testing takes place. The damage pattern of the test specimen, in particular on the side facing the mass flow, can be examined with regard to relative damage intensity and different test specimens can be objectively compared with each other. A further advantage of the method according to the disclosure is an increased repeatability compared to the state of the art, so that technically identical results are obtained when the method is carried out again with a similar test specimen, so that an objective test method is created which offers the possibility of comparing different test specimens with each other in an objective and standardized manner.

After carrying out the method according to the disclosure, the test specimen is damaged, although it does not necessarily have to be burnt through, i.e. it is intact. However, the test specimen may also burn through.

In an advantageous further development of the method, it may be provided that at least one measured value is determined by means of a determination device. Measured value is not limited to the determination of a physical variable (for example force or temperature, acoustic measured variables), for example this can also mean the determination of an image. The term "measured value" should therefore be interpreted broadly. Preferably, the measured value is determined before and/or during and/or after exposure to the high-speed thermal mass flow. Thanks to the determination device, the informative value of the method according to the disclosure can be further improved.

In an advantageous further development of the method, it can be provided that a period of time between the start of exposure and the occurrence of burn-through of the test specimen is determined by means of a determination device.

Thanks to this further development, it is possible to precisely determine the time until the test specimen burns through, which can be regarded as a measure of the fire protection shielding properties.

According to the disclosure, a force acting on the test specimen as a result of the load is continuously determined by means of the determination device. The determined force or the force curve can provide information about the acting mass flow, so that this can be used for standardization between two or more runs of the method according to the disclosure and thus the repeatability is increased. In other words, fluctuations in the action characteristic can be determined and taken into account accordingly during the evaluation.

Preferably, it can be provided that the time period between the start of loading and the occurrence of a drop in force based on a burn-through of the test specimen is determined.

A particularly preferred method is a method for determining the burn-through resistance of a test specimen over time, wherein the test specimen is subjected to a thermal high-speed mass flow and a force acting on the test specimen as a result of the exposure is continuously determined, wherein a time interval between the start of the exposure and the occurrence of a force drop based on a burn-through of the test specimen is determined.

The force is determined by means of the determination device. For this purpose, the force introduced into the test specimen by the thermal high-speed mass flow is determined continuously over the entire time of exposure, so that the time span between the start of exposure and the occurrence of a force drop based on or resulting from burn-through of the test specimen can be determined. The time is determined with a time measuring device, so that the time span, i.e. the time difference, between the time of the start of the application and the time of the occurrence of a force drop based on a burn-through of the test specimen can be determined. The determination device can include the time measuring device.

In other words, during the entire time the test specimen is exposed to the thermal high-speed mass flow, hereinafter also referred to as mass flow for short, the force introduced into the test specimen by the mass flow is determined by means of a determination device designed as a force measuring device and can preferably be plotted in a force-time curve, also referred to as a force-time curve. As soon as the test specimen burns through, there is a drop in force, i.e. the force introduced into the test specimen by the mass flow is abruptly reduced, as this no longer introduces any force or at least only a small amount of force into the test specimen, as the mass flow flows through or past the test specimen due to the burning through of the test specimen. The time at which the force drops corresponds to the time at which the test specimen burns through, so that the time span between the start of loading and the occurrence of burn-through of the test specimen can be determined very precisely. Preferably, the time of the start of the drop in force corresponds to the time of the start of the burn-through of the test specimen. Thanks to the method according to the disclosure, the time span can be determined with an accuracy of $\frac{1}{10}$ (0.1) second.

The burn-through resistance of a test specimen over time corresponds to the time span between the start of exposure and the occurrence of burn-through of the test specimen, i.e. the breakthrough of the thermal high-speed mass flow through or past the test specimen. The burn-through resistance over time can thus be regarded as a component or material property that makes it possible to make a statement about the fire protection properties and the resistance to thermal effects of this component or material. Preferably, the method according to the disclosure is suitable for determining the pulse curve (pulse curve), in particular by continuously determining the force.

The high-speed thermal mass flow, or mass flow for short, is provided by means of an impact medium and applies heat and a force to the test specimen. The high-speed thermal mass flow can take the form of a beam that is directed at the test specimen. The force that is introduced into the test specimen by the mass flow, i.e. acts on it, is provided by the impact of the mass flow with a flow velocity. Particles may be added to the mass flow, whereby the mass flow is particularly preferably a gaseous flow. The mass flow has a flow velocity which is preferably higher than 50 m/s at its maximum, particularly preferably higher than 100 m/s, most preferably higher than 200 m/s. Preferably, the flow velocity is supersonic and higher than 300 m/s. This comes closest to the thermal runaway conditions of an accumulator. The mass flow has a temperature that is significantly higher than the ambient temperature, so that the heat is transferred at least locally into the test specimen and its temperature increases. Preferably, the maximum temperature of the mass flow is higher than the melting temperature of the test specimen. Preferably, the temperature of the mass flow at its maximum is higher than 500° C., particularly preferably higher than 600° C. and very particularly preferably higher than 800° C. This means that the burn-through resistance over time can also be determined for test specimens made of a material with a relatively high melting point. Preferably, the maximum temperature that can be generated for the test specimen is higher than the melting temperature of the test specimen, in particular the maximum temperature that can be generated is higher than the temperature of the mass flow. The mass flow has a temperature above the ambient temperature, whereby the kinetic energy of the mass flow is converted into thermal energy, i.e. a temperature increase in the test specimen, when the mass flow strikes the test specimen. This means that the test specimen can be heated to a temperature that is higher than the temperature of the mass flow itself. This saves energy and costs.

The burning through of the test specimen is also referred to as a breakthrough of the test specimen, which is meant in the sense of breaking through an obstacle that the test specimen represents for the mass flow. The burning through of the test specimen represents an at least local melting and/or burning of the material of the test specimen by the mass flow, so that the geometric shape of the test specimen is changed as a result. In other words, the material is melted at least locally and flows out of the area of influence of the mass flow and/or burns at least partially.

In a preferred further development, the recorded force is determined continuously with a time resolution of at least ½s of a second. This means that 25 force measurement values per second are recorded. In a particularly advantageous further development, the time resolution is at least ½0 of a second. Thanks to such time resolutions, the accuracy of the method according to the disclosure can be further improved.

The test specimen can preferably be designed as a test piece, for example in the form of a plate, or as a component with a geometric shape that differs from a plate. The method according to the disclosure thus offers the possibility of testing both plate-shaped test specimens and real components such as housings or lids for their burn-through resistance over time.

Preferably, the force drop that occurs due to the burning through of the test specimen can be more than 50%, particularly preferably more than 80% of the force applied before the force drop. Particularly preferably, the drop in force can be more than 50%, especially preferably more than 80% of the force applied immediately before the drop in force. This means that the force drops sharply during burnthrough compared to a previously approximately constant force, so that the time at which the test specimen burns through and thus the time period can be precisely determined. Preferably, the drop in force occurs within a time of less than 2 seconds, particularly preferably in less than 1.5 seconds and most preferably in less than 1 second. The drop in force thus represents a kind of jump in a force-time diagram, so that the time of the start of the drop in force and thus the time of the start of burn-through can be determined precisely.

In an advantageous further development of the method, the mass flow passes through an opening in the test specimen created by the burn-through. The mass flow is thus not directed to an edge section of the test specimen, but preferably to a central section of the test specimen, so that an opening, which preferably has an essentially round shape, in particular an essentially circular shape, is formed in the test specimen as a result of the burn-through, through which the mass flow flows after the burn-through has taken place. Since the mass flow flows through the opening and therefore at least no longer completely hits the test specimen, it applies no or only a very low force to the test specimen after the burn-through, in contrast to a time before the burnthrough. In other words, the mass flow makes its way through the burn-through and the resulting opening in the test specimen so that it can flow through the test specimen unhindered, i.e. without significant force being applied to the test specimen. This means that the drop in force caused by the burn-through can be even more abrupt and the measurement accuracy can be further improved.

In another advantageous further development of the method, the time at which the loading begins is determined by an increase in force. At the time at which the mass flow is applied to the test specimen, the force is also applied, so that the previously unloaded test specimen is now loaded by the mass flow, i.e. a force is applied to it. This allows the time at which the increase in force begins to be applied to be determined. It is also conceivable and possible that the time of the start of the application is not the same as the time of the start of the force increase, but is a later time, for example a time that has a predetermined time interval to the time of the start of the force increase or the time of the start of the application is the time at which the force reaches a first maximum (first inflection point in the force-time curve), which is caused, for example, by a start pulse of the mass flow. In this way, for example, a preheating phase of the test specimen can be taken into account and the determination of the burn-through resistance over time can be further improved.

In an alternative version of the method, however, it is also conceivable and possible that the time of the start of the exposure is determined by the start of the high-speed thermal mass flow, for example the time of ignition. With such an embodiment of the method, it is possible, for example, to simulate the ignition of a fire occurring in the field, since the time of the start of the mass flow can be regarded as the start of the ignition of a fire. The method according to the disclosure thus not only offers a single way of determining the burn-through resistance over time. Rather, the method according to the disclosure also offers the possibility of determining the time of ignition, the time of the start of the increase in force and the time of the first maximum and the resulting time periods in a single run, thus providing a holistic result for the burn-through resistance of the test specimen over time. Thus, the method according to the disclosure not only provides very accurate measurement results, but also saves costs and resources.

In another advantageous further development of the method, a temperature of the test specimen is determined. The temperature is determined by means of a temperature measuring device while the test specimen is exposed to the mass flow. The determination device preferably comprises the temperature measuring device. The temperature measuring device can, for example, be designed as a thermocouple, thermometer, infrared thermometer or the like. The temperature measuring device can preferably be designed as an analog or digital measuring device. Preferably, the temperature is determined continuously over time, so that a temperature-time curve is recorded which can be used to determine the burn-through resistance over time. It is possible that a force-time curve is recorded redundantly and simultaneously. Preferably, the temperature is measured in the section of the test specimen to which the mass flow is directed. It is particularly preferable to determine the temperature on the side of the test specimen facing away from the mass flow. This allows the temperature to be determined in the section of the test specimen that is exposed to the mass flow without being directly hit by the mass flow. In other words, the test specimen shields the temperature measuring device. The side of the test specimen facing away from the mass flow is the side of the test specimen facing away from the side on which the mass flow hits before it burns through. In other words, the side facing away is the back of the side that is hit by the ground current before burn-through. In practical application, the side of the test specimen facing away from the ground current is the side of the test specimen that is to be shielded against fire. Furthermore, this also allows conclusions to be drawn about the thermal conductivity of the test specimen.

In another advantageous further development of the method, it may be possible to determine the temperature at several points on the test specimen. This allows the temperature distribution and the temperature spread, i.e. its change over time, to be determined.

In a further advantageous further development of the method, the start of exposure can be determined by exceeding a predetermined temperature of the test specimen, i.e. the time of the start of exposure corresponds to the time at which a predetermined temperature of the test specimen, i.e. a predetermined temperature, is exceeded. This makes it possible to disregard a preheating phase of the test specimen when determining the burn-through resistance over time, i.e.

to exclude the preheating phase from the time period used as a measure of the burn-through resistance over time.

In a further advantageous further development of the method, it may be provided that the force and the temperature are determined in a joint data acquisition device. This can be done, for example, by means of a measuring computer in the form of a computer. This offers the possibility of automatically evaluating the measurement results, for example by determining the different determination methods described above for the time period as a measure of the burn-through resistance over time. Preferably, the common data acquisition device can comprise a multimeter. Preferably, the determination device comprises the data acquisition device.

Furthermore, in an advantageous further development of the method, it can be provided that a pulse acting on the test specimen is determined by means of the force acting over the period of time. In this way, the force continuously determined over the time of application can be used to determine the impulse or the impulse curve which is introduced into the test specimen by the mass flow. The impulse essentially corresponds to the so-called thrust integral of the mass flow. The shear integral can serve as a measure of the damage. The impulse can preferably be between 1 Newton second (Ns) and 250 Ns. Mass currents that introduce an impulse of up to 100 Ns into the test specimen have proven to be particularly advantageous. This saves costs and resources.

In an advantageous further development, it may be provided that a thermal photograph and/or a thermograph of the test specimen is recorded. This can be done using an infrared camera, for example, whereby the determination device can include the infrared camera. This allows the temperature spread in the test specimen to be determined over the time of exposure, which also makes it possible to determine so-called hotspots in the test specimen. Preferably, thermal photography and/or thermography is carried out on the side of the test specimen facing away from the mass flow. This offers the advantage that interference generated by the ground current is reduced and that the side of the test specimen that represents the side to be shielded is viewed. In an advantageous further development, the thermography can be carried out as differential thermography, so that an albedo is reduced. In this way, the determination device comprising an infrared camera can be used to determine the burn-through resistance over time.

In a further advantageous further development, it may be provided that a movie recording of the impact is recorded, preferably with a frame rate of more than 30 frames per second (frames per second, fps for short), particularly preferably more than 100 frames per second and very particularly preferably more than 200 frames per second. The film can be recorded using a high-speed camera, for example, whereby the determination device can comprise the high-speed camera. Preferably, the movie is recorded of the impact of the mass flow on the test specimen and/or the side of the test specimen facing away from the mass flow. Thus, the determination device comprising a high-speed camera can be used to determine the burn-through resistance over time.

In an advantageous further development, it can be provided that the data acquisition device, which is designed as a computer, for example, also records the thermal photography and/or the thermography and/or the film recording of the camera in addition to the force and the temperature.

Preferably, this data acquisition device is designed in such a way that it automatically synchronizes the curves of the measured values of the respective measuring devices (e.g. force or temperature) and the film recording and/or thermal photography and/or thermography using markers. Preferably, the resulting data is stored in a common file by the data acquisition device. For example, an ignition pulse, optical or acoustic ignition signal or the like can serve as a marker for the synchronization.

In an advantageous further development, it may be provided that the data acquisition device is designed to evaluate the film for sparks on the side of the test specimen facing away from the ground current by means of automated image evaluation and thus to determine the time at which the sparks begin to fly. The start of the sparking on the side of the test specimen facing away from the ground current corresponds to the burn-through of the test specimen. This can be done in addition to the force measurement or temperature measurement, but a force measurement or temperature measurement can also be dispensed with.

In a further advantageous further development, it may be provided that the data acquisition device is designed in such a way that the film is scanned by means of automated image evaluation for the time at which the mass flow begins to act on the test specimen. In other words, the relevant times for determining the time period, i.e. the time of the start of the impact and the time of the burn-through, can be determined and thus the burn-through resistance can be determined by means of the automated image evaluation of the film recording. In this way, redundancy to the other measuring devices can be realized and the accuracy can be further increased. Alternatively, the automated image evaluation can also be carried out without the use of additional measuring equipment.

In an advantageous further development of the method, it can be provided that an acoustic signal is determined during the impact. This acoustic signal can be determined by means of an acoustic measuring device, which can comprise a microphone, for example. Preferably, the determination device comprises the acoustic measuring device.

The acoustic measuring device is preferably connected to the data acquisition device. This means that all the measurement data obtained can be processed and synchronized in a common data acquisition device.

In an advantageous further development, the acoustic signal can also be started at a time before the load is applied. This allows the time at which the mass flow begins to act on the test specimen to be determined acoustically, so that redundancy can be created here and this can serve as a marker for the synchronization of the individual measurement sequences. Alternatively, the acoustic evaluation can also be carried out without the use of additional measuring equipment.

Furthermore, the acoustic signal can also be used to determine the time at which the test specimen burns through. This means that the time span can be determined as a measure of the burn-through resistance over time using the acoustic measuring device.

Furthermore, the acoustic measuring device can also provide redundancy to the other measuring devices, which is also based on a different measuring principle. Furthermore, determining the acoustic signal has the advantage that it is not impaired in its measuring properties by smoke development during exposure, as is possible with optical measuring devices such as a camera, for example. This ensures that the burn-through resistance can be determined even if the other measuring devices are impaired and, thanks to the determination of the acoustic signal, a cost-intensive repetition of a test is not necessary.

In a further advantageous embodiment of the method, it may be provided that the jet velocity of the mass flow is determined. The jet velocity can be determined by means of a jet velocity measuring device, for example by means of Doppler spectroscopy. Preferably, the beam velocity can be determined spatially before the mass flow strikes the test specimen. In other words, the jet velocity measuring device is arranged spatially between the application means and the test specimen. This offers the advantage that, for example, in addition to the force or temperature applied to the test specimen, the jet velocity is also continuously determined and this can be plotted over time, so that any changes in the force/temperature curve can be compared with those of the jet velocity curve, thereby further improving the measuring accuracy of the method according to the disclosure. The mass flow can be calculated from the force and velocity measurement. Alternatively or additionally, it may be provided that the jet velocity is determined on the side of the test specimen facing away from the mass flow, i.e. the jet velocity of the mass flow is only determined here after the burn-through. The jet velocity of the mass flow can also be referred to as the flow velocity of the mass flow.

In an advantageous further development, the test specimen comprises a material for a battery housing or is a part of a battery housing or a battery housing. The method according to the disclosure is particularly suitable for determining a material, i.e. a material for a battery housing or a part of a battery housing or a battery housing itself. Battery housings are used to hold and shield batteries. Batteries are also understood to be accumulators, in particular lithium-ion accumulators for motorized vehicles. In the event of a fire in such accumulators, it is necessary to protect the passengers of the motor vehicle from the fire in such a way that they can leave the vehicle without injury before the fire penetrates into the passenger compartment.

In an advantageous further development, the mass flow is directed onto the test specimen orthogonally or at an angle. This increases the variability of the method so that the test specimen can be subjected to the mass flow at an angle that corresponds to the practical conditions of subsequent use. Alternatively or additionally, it is also conceivable to adjust the distance between the application means providing the mass flow and the test specimen in order to adjust the temperature profile and beam characteristics.

In a preferred embodiment of the process, the mass flow is provided by a rocket propellant charge, an acetylene burner with mass feed, flame spraying, galvanic element or plasma spraying. These are also referred to as impact means. Rocket propellant charges that are designed as solid-state composite propellant charges have proven to be particularly advantageous, as they provide a reproducible and partially constant (more uniform) mass flow over the time of application and repeatability is increased, as the tolerances between the individual propellant charges are very low.

In an advantageous further development, the galvanic element is designed as a secondary element, also known as an accumulator. The galvanic element comprises at least one cell. The galvanic element is particularly preferably designed as a lithium-ion accumulator. Thanks to such a design of the application means, a test specimen can be tested under quasi-real conditions.

In an advantageous further development, the galvanic element is preferably arranged in such a way that the ground current emerges from the galvanic element against the force of gravity. This offers the advantage that, in contrast to a suspended arrangement, no or only a small amount of flammable, liquid electrolyte can escape from the galvanic element before the earth current emerges, thus counteracting uncontrolled combustion or even deflagration.

In a further advantageous further development, it may be provided that a fuel for the loading means for providing the mass flow is weighed at least before the start of the loading and after the loading, preferably the weighing takes place continuously during the loading. In this way, the mass of the fuel is determined before or after loading or during loading, so that a comparison can be made with the fuel consumption of other tests and thus any faulty loading means can be determined. Weighing can be carried out using a mass measuring device, for example in the form of a balance.

In an advantageous further development, it can be provided that the mass flow flows through a nozzle and the emission characteristic of the mass flow is thereby adjusted. In this case, the mass flow flows through a nozzle starting from the application means and hits the test specimen after passing through the nozzle, whereby the nozzle is preferably at a distance from the test specimen. The nozzle has a predetermined nozzle geometry, which is designed in such a way that the emission characteristics of the mass flow provided by the impact means can be changed and adapted accordingly and thus adapted to the real conditions of the thermal runaway, in particular with regard to temperature, jet opening angle and momentum. Thanks to the use of a nozzle, the mass flow can be changed so that the emission characteristics correspond even more closely to the real conditions, for example the failure of a lithium-ion battery. In particular, the following geometric characteristics of the nozzle can be varied: central nozzle bore, opening angle of the cone, length of the central nozzle bore and length of the cone.

A nozzle is preferably used in combination with a rocket propellant charge.

Furthermore, a test device for thermomechanical testing of a test specimen is proposed, comprising a holder having a receiving portion in which the test specimen can be received directly or indirectly, and an application means for providing a high-speed thermal mass flow which can be directed to the test specimen, the test apparatus having a determination device comprising a force measuring device operatively coupled to the holder and arranged to determine the force introduced into the test specimen by the mass flow to determine a force-time curve.

Thanks to the test device according to the disclosure, a material can be tested or preselected with regard to its fire protection properties without great effort and expense.

The test device is preferably suitable for carrying out the method described above with all the aforementioned further developments. Thus, all the aforementioned features of the method and their advantageous further developments can be transferred to the test device accordingly. Likewise, all the features of the test device and its subsequently implemented further embodiments can be transferred to the method and its advantageous further embodiments.

The test device has a determination device. Thanks to this determination device, measured values can be determined before and/or during and/or after loading. The determination device comprises at least one of the following means: time measuring device, temperature measuring device, acoustic measuring device, infrared camera, high-speed measuring device, data acquisition device. The determination device can have these individually or in combination.

Furthermore, due to the reproducible conditions (and their measurement), the relative resistance of test specimens can be compared based on the surface damage and/or the back-side temperature, even if they do not burn through, and thus an efficient pre-screening (preselection) of variants of test specimens can be carried out in order to subject the "best" test specimen to further, far more complex fire protection tests.

The determination device is preferably designed to determine the burn-through resistance of the test specimen, in particular to determine the burn-through resistance of the test specimen over time.

This makes it possible to determine the exact time until the test specimen burns out.

According to the disclosure, it is provided that the determination device comprises a force measuring device which is operatively coupled to the holder and which is set up to determine the force introduced into the test specimen by the mass flow.

The test device can therefore be used to determine the force introduced into the test specimen by the thermal high-speed mass flow continuously over the entire time of the application. This makes it easy to determine fluctuations in the mass flow so that these can be taken into account accordingly when evaluating the test. This allows the test accuracy to be further increased.

Furthermore, the time span between the start of the application and the occurrence of a drop in force based on or resulting from a burn-through of the test specimen can be determined. For this purpose, the force measuring device is preferably designed in such a way that it continuously records the force over the time of application.

The holder of the test device has the receiving section in which the test specimen can be received directly or indirectly, i.e. with an intermediate element. Preferably, the receiving section is designed as a recess or an opening into which the test specimen or the intermediate element can be received, so that the test specimen is preferably held immovably and accurately positioned relative to the receiving section, at least in the direction of action of the mass flow.

The holder can be operatively coupled to the force measuring device, whereby the force measuring device is set up to determine the force introduced into the test specimen by the mass flow. In other words, the holder and thus its receiving section is at least operatively connected to the force measuring device in such a way that a flow of force between the test specimen, which can be received in the receiving section, and the force measuring device is ensured. This means that the force applied to the test specimen by the mass flow can be determined by the force measuring device.

The application means is designed to provide a high-speed thermal mass flow, the application means being oriented such that the mass flow would impinge on the specimen receivable in the receiving section. In other words, the application means is aimed at the predetermined position for the test specimen by the receiving section.

In an advantageous further development, the holder comprises a temperature- and fire-resistant material, for example made of steel and/or a ceramic material. This ensures that the holder is not damaged by the mass flow when the test specimen is subjected to it, thus increasing the service life of the test device.

In an advantageous further development, the force measuring device can comprise a force transducer. Force transducers are also referred to as force sensors or load cells. In particular, the force transducer can be designed as a piezo force transducer. Preferably, the force measuring device is arranged between the holder and a rigid support structure, for example a machine bed, foundation or bracket. In a preferred further development, the force measuring device has a nominal force of between 250 N and 750 N, particularly preferably 500 N.

In a preferred further development, it can be provided that the force measuring device is only calibrated for compression or tension, as the mass flow introduces a force with a previously known direction into the test specimen and thus either a compressive force or a tensile force acts. This improves the accuracy and simplifies the calibration process. Standard weights of 1 kg or 5 kg are particularly suitable for calibration.

In an alternative embodiment, the force measuring device can be used to measure a displacement (travel) of the holder relative to a rigid bracket, with an elastic element being arranged between the holder and the bracket. The elastic element can comprise at least one spring element, for example in the form of a spiral spring or a disk spring. Since the stiffness of the elastic element is known, the force acting on the bracket can be calculated based on the displacement of the bracket relative to the rigid bracket. In an advantageous further development, it is conceivable and possible to translate the displacement of the bracket by means of a lever mechanism, so that the measuring accuracy can be further increased. Furthermore, a damping element may also be provided between the mount and the rigid bracket. This allows vibrations in the system to be damped and the measurement of the force can be further improved.

In an advantageous further development, the determination device can have a temperature measuring device for determining the temperature of the test specimen. The temperature measuring device preferably comprises a thermocouple and/or a thermometer and/or an infrared thermometer. The temperature measuring device preferably comprises several thermocouples and/or several thermometers and/or several infrared thermometers. The temperature measuring device can preferably be designed as an analog or digital measuring device. Preferably, this is arranged on the side of the receiving section or the test specimen facing away from the application means or directed towards it, i.e. it determines the temperature of the rear side of the test specimen or, if several thermocouples and/or several thermometers and/or several infrared thermometers are used, the temperature and its distribution on the rear side of the test specimen. The side facing away from the exposure means corresponds to the side of the test specimen facing away from the mass flow.

In a further advantageous further development, the loading means is accommodated in a blind hole opening of a carrier element. The carrier element can be designed as a tube that is closed on one side and has a cup-shaped recess in which the loading means is accommodated and is advantageously held in a precise position. Preferably, the carrier element has a locking device that secures the loading means relative to the carrier element so that the loading means is prevented from falling out of the carrier element. The locking device can be designed as a force-fit locking device, for example as a clamping device, and/or as a form-fit locking device, for example a locking element or latching elements. The carrier element can be detachably or non-detachably connected to the bracket. In the case of a detachable design, the carrier element is interchangeable so that it can be replaced to suit the application means. This means that the test device can be used universally and is not restricted to a specific application means.

In an advantageous embodiment, the application means can be adjusted relative to the holder. This allows the application means to be positioned in a desired position relative to the bracket and its mounting section and ultimately relative to the test specimen, so that the test specimen can be subjected to the mass flow in the desired manner. It is preferable for the carrier element to be held adjustably on the bracket.

Preferably, it can be provided that an angle and/or a distance between the impact means and the holder can be adjusted. This means that the impact means can be adjusted in such a way that the mass flow strikes the test specimen orthogonally or at an angle. Furthermore, the distance between the impact means and the holder and its receiving section and thus also in relation to a test specimen that can be accommodated in the receiving section can be adjusted. Preferably, the carrier element can be held pivotably on the bracket. Alternatively or additionally, the carrier element can be held on the bracket so that it can be displaced in translation, so that the distance between the carrier element and the holder can be adjusted and/or the carrier element can be adjusted parallel to the receiving section or the test specimen, so that when the angle of the application means is set, it is directed towards the receiving section or the test specimen, i.e. so that the mass flow preferably hits the center of the test specimen. Preferably, the adjustable angle is between 0° and 60°, particularly preferably between 0° and 45°. An angle of 0° corresponds to a mass flow directed orthogonally onto the receiving section or the test specimen.

The test device preferably has a baffle plate, which is arranged on the side of the receiving section facing away from the impact means. This baffle plate is preferably made of a temperature- and fire-resistant material or comprises such a material, for example steel or a ceramic material. Baffle plate is not to be understood as necessarily being made of sheet metal. Alternatively, the baffle plate can also be referred to as a baffle element. The baffle plate is arranged in the alignment of the mass flow so that it is directed in a predetermined direction by means of the baffle plate after the test specimen has burned through. This allows the mass flow to be directed in the direction of an extraction device. The baffle plate is preferably rotationally and/or translationally adjustable relative to the holder. This allows the baffle plate to be adjusted to the setting position of the impact means in such a way that the mass flow can be directed in the desired direction, preferably in the direction of the trigger device. The baffle plate is preferably arranged in a force-decoupled manner from the force measuring device. This ensures that the force measuring device only determines the force applied to the test specimen and that the measurement is not distorted by the impact of the mass flow on the impact plate after burn-through.

In an advantageous further development, a test specimen holder is provided in which the test specimen can be accommodated, whereby the test specimen holder is accommodated in the receiving section. Thanks to a test specimen holder, the test specimens can be accommodated on the test device easily, conveniently and in a time-saving manner. The test specimen holder preferably has a mesh grid that can be placed over the test specimen. This ensures that the test specimen is securely positioned on the test specimen holder. The test specimen holder is preferably made of steel or aluminum or comprises such a material.

The mesh grid is preferably made of a material that is resistant to high temperatures and thermal shock, preferably fiber composite ceramic. Preferably, the fiber composite ceramic is a ceramic fiber-reinforced ceramic. Advantageously, the fibers are oriented long fibers. Preferably, the lattice is a fabric of ceramic long fibers embedded in a ceramic matrix. The ceramic long fibers and/or the matrix are particularly preferably made of a metal oxide ceramic material such as aluminum oxide or mullite. However, other ceramic materials for the fibers and/or the matrix are also possible. A large number of fundamentally suitable materials for both the matrix and the fibers are known from the prior art.

It has been shown that such a mesh grid can withstand high thermal loads, so that it is particularly suitable for test specimens that include an organic insulating material, as fires and deflagrations often occur with these.

The mesh grid preferably has a central opening with an area of between 3 $cm^2$ and 25 $cm^2$, so that the mass flow can act unhindered on the test specimen. It is particularly preferable for the central opening to have an area of between 3 $cm^2$ and 7 $cm^2$, especially 5 $cm^2$, in the case of a low scattering mass flow (opening solid angle of the mass flow less than 10°). Particularly preferably, the central opening has an area of between 10 $cm^2$ and 20 $cm^2$ with a scattering mass flow (opening solid angle of the mass flow greater than 10°).

Investigations have shown that stray mass currents largely correspond to those of a damaged battery cell. In particular, a distance of between 40 mm and 60 mm between the loading means and the test specimen has proven to be advantageous. A particularly advantageous arrangement has a mass flow with an opening solid angle of 40°, whereby the loading means is at a distance of 50 mm from the test specimen and the central opening of the mesh grid has an area of 16 $cm^2$.

The opening solid angle is the opening angle of the cone of the mass flow, whereby this is twice the angle between the generatrices and the axis of the cone.

Preferably, the opening clearance angle has a value between 3° and 10°. Preferably, the mesh grid is fixed at a distance from the surface of the test specimen. This can be done, for example, by either fixing the mesh on the test specimen holder or by fixing it floating on the test specimen. Floating mounting" means that the mesh grid rests on the test specimen or is held at a defined distance from it. A force is applied to the mesh in the vertical downward direction, for example the weight of the mesh and the parts connected to the mesh. The floating mesh grid can also have a vertical guide that allows the mesh grid to move in the vertical direction but fixes it in the X-Y plane. Preferably, the distance between the mesh grid and the surface of the test specimen is between 1 and 5 mm.

In an advantageous embodiment, the test specimen holder is designed like a frame so that the test specimen can be inserted into it. Thanks to such a design, it can be ensured that the test specimen holder is not damaged when the test specimen is subjected to the mass flow and/or that this has no or only a very minor influence on the measurement results.

In an advantageous version of the test device, a fixing device can be provided for fixing the test specimen or the test specimen holder to the receiving section. This fixing device can be switched between a fixing position and a release position, so that in the fixing position the test specimen or the test specimen holder is fixed relative to the receiving section and in the release position the test specimen or the test specimen holder can be picked up or removed from the receiving section. The fixing device can be designed as a clamping device, for example as a clamping or tensioning lever. Alternatively or additionally, the fixing device can be designed as a positive locking device. Furthermore, the fixing device can also be formed by screw elements such as screws, nuts or stud bolts. The fixing device ensures that the test specimen or the test specimen holder does not move during the application of the mass flow. In an advantageous further development, such a fixing device can also be additionally provided on the test specimen holder in order to fix the test specimen relative to the test specimen holder.

In an advantageous further development, the determination device can comprise a high-speed camera and/or an infrared camera and/or an acoustic measuring device. The infrared camera can be used to record a thermal photograph and/or a thermograph of the test specimen. This infrared camera is directed at the recording section or the test specimen that can be inserted there. Preferably, it is directed towards the side of the receiving section opposite the exposure means or the test specimen that can be inserted there. This allows the thermal photography or thermography of the back of the test specimen to be recorded. The high-speed camera, also known as a high-speed camera, can be used to record a film of the application of the mass flow to the test specimen. For this purpose, the high-speed camera is directed towards a test specimen that can be recorded in the recording section, preferably in such a way that the film recording of the impact of the mass flow on the test specimen and/or on the side of the test specimen facing away from the mass flow can be recorded. Preferably, the high-speed camera is set up in such a way that an image frequency of more than 30 images per second, particularly preferably more than 100 images per second, can be recorded. Preferably, the high-speed camera can comprise an optical filter device that acts like a type of welding goggles, for example. This improves the film recordings of the impact. Two high-speed cameras can also be provided, whereby one of the high-speed cameras comprises an optical filter device and this is preferably directed towards the impact section of the mass flow on the test specimen. The acoustic measuring device is preferably designed as a microphone. This microphone is particularly preferably designed as a directional microphone and is directed at the impact means or at the test specimen. It may be provided that the test device has two microphones, one of which is directed towards the impact means and the other towards the test specimen. The acoustic measuring device offers the advantage that its measuring properties are not impaired by smoke development during the impact.

In an advantageous further development, it may be provided that the infrared camera and/or high-speed camera and/or the acoustic measuring device is adjustably mounted on the console. This allows the infrared camera and/or high-speed camera to be optimally aimed at the impact section of the mass flow.

In a further advantageous further development, the test device has an extraction device and/or a blower device or can be connected to such a device.

The extraction device can be used to extract the gases and smoke produced by the mass flow. For example, this can be arranged on the side of the receiving section or the test specimen facing away from the mass flow, so that the mass flow can be at least partially extracted after burning through. Alternatively or additionally, the extraction device can also be arranged on the side of the receiving section facing the mass flow, so that the smoke produced during exposure can be extracted. This offers the advantage that when using a high-speed camera, the view of the test specimen is kept clear during exposure and is not impaired by smoke. This means that the accuracy of the test, for example when determining the burn-through resistance over time, can be further improved using the high-speed camera.

The extraction device can be part of the test device or can be connected to it, for example by means of a hose. The extraction device preferably comprises a wet scrubber and/or a HEPA filter (HEPA filter=High-Efficiency Particulate Air/Arrestance Filter). This wet scrubber is used to wash out components that are hazardous to health and the environment, such as acids and flue gases. The HEPA filter cleans soot, fine particles and dust.

The blower device can be provided as an alternative or in addition to its extraction device, whereby this is preferably arranged on the side of the receiving section facing the mass flow. The blower device is set up and arranged in such a way that it moves away the smoke produced during exposure by means of a fluid flow, in particular an air flow. This offers the advantage that when a high-speed camera is used, the view of the test specimen is kept clear during exposure and is not impaired by smoke. This means that the accuracy of determining the burn-through resistance over time can be further improved using the high-speed camera. The fluid flow must be dimensioned in such a way that it has only an insignificant and technically negligible effect on the mass flow during exposure.

Preferably, the blower device can comprise a compressed air lance for directing the fluid flow, which can be connected to a compressed air hose for connecting the compressed air lance to a pneumatic system. Alternatively or additionally, the blower device can comprise a fan and/or a compressor.

In a further advantageous further development of the test device according to the disclosure, the force measuring device is at least partially enclosed by a shield or an encapsulation. In a particularly preferred embodiment, the force measuring device is completely enclosed by an encapsulation, with an electrical line passing through the encapsulation in a sealed manner. Preferably, the shielding or encapsulation is a sealed thermal encapsulation. In this way, a negative interference effect of the gases and particles emitted by the mass flow on the force measuring device is at least greatly reduced, so that a falsification of the force measurement is counteracted and thus the measuring accuracy of the test device is further improved.

In an advantageous further development, a jet velocity measuring device can be provided to determine the jet velocity of the mass flow. The jet velocity measuring device can also be referred to as a flow velocity measuring device. Preferably, the jet velocity measuring device is a Doppler spectroscope. Preferably, the jet velocity measuring device can be arranged between the pick-up section and the application means, so that the jet velocity can be determined spatially before the mass flow strikes the test specimen. Alternatively or additionally, the or a further jet velocity measuring device can be arranged on the side of the receiving section or the test specimen facing away from the impact means. This allows the jet velocity to be determined after the test specimen has been burned through.

In an advantageous further development, the loading means is designed to provide an impulse between 1 Newton second (Ns) and 250 Ns, particularly preferably an impulse between 1 Ns and 100 Ns.

In a further advantageous further development, the application means is designed to provide the mass flow for a flow duration of between 2 seconds and 30 seconds, particularly preferably for a flow duration of between 5 seconds and 25 seconds. This ensures that the mass flow acts on the test specimen for a sufficient time so that the burn-through resistance can be determined and that the mass flow does not continue to flow for a useless time after burn-through. In other words, the flow duration can be adapted to the nature of the test specimen or to the flow duration of the fire to be simulated, for example the thermal runaway of a lithium-ion battery.

Preferably, the fuel of the pressurizing means is selected in such a way that the mass flow has a specified flow velocity, momentum, temperature, opening angle and chemical composition. It may be provided that the fuel supply device adjusts the fuel according to a requirement profile and feeds it to the pressurizing means. It is therefore conceivable and possible to adjust the fuel and its quantity before or even during loading. The mass flow can thus be adjusted according to the intended test parameters.

In a preferred embodiment, the pressurization means has a device that is designed to add particles to the mass flow. The mass flow is preferably a gaseous flow. In this way, for example, the force introduced into the test specimen by the mass flow can be adjusted.

Preferably, it may be provided that the test device includes a mass measuring device for determining the mass of a fuel intended for the loading means. This mass measuring device can be in the form of a scale, for example. Alternatively, the volume of the fuel can also be determined so that the mass can be determined from this.

In an advantageous further development, the pressurization means has a nozzle or can be coupled to such a nozzle. Preferably, the nozzle has a nozzle outlet channel which has a predetermined length and a predetermined opening cross-section and a predetermined opening angle. The nozzle thus has a predetermined nozzle geometry at the outlet end. The nozzle geometry can be selected in such a way that different emission characteristics can be set with the same type of impact means, for example the impact area of the mass flow and/or the impact velocity and momentum of the mass flow can be set. The nozzle geometry is determined, for example, by the length of the nozzle outlet channel (corresponds to the length of the outlet cone, also known as the outlet cone) and opening cross-section (diameter of the outlet opening) and opening angle (cone opening angle of the outlet opening). This allows the impulse and the impact area to be specifically adjusted.

The opening angle of the nozzle outlet can be selected according to the desired emission characteristics. For example, this could also be zero, so that the nozzle outlet is formed by a circular cylindrical channel. Preferably, the opening angle has a value between 45° and 135°. The opening angle corresponds to twice the angle between the generatrices and the axis of the cone.

Thanks to this adaptability of the nozzle geometry, the emission characteristics of different lithium-ion accumulators in the event of failure (also known as thermal runaway) can be simulated, in particular with regard to the opening angle of the ejection cone (outlet cone, nozzle outlet channel) of the hot gases and particles, temperature at the point of impact, integral mass momentum at the impact surface, mass momentum per surface, jet velocity.

Alternatively, the nozzle can also be arranged on the carrier element that holds the impact medium. This means that nozzles with different geometries can be easily attached to the carrier element and the mass flow of the impact medium can be guided through them. It may be provided that the nozzle has an adjustable nozzle geometry, which is preferably also adjustable during application. This allows the mass flow to be further equalized in terms of its flow properties over the duration of the impingement.

In an advantageous embodiment of the test device according to the disclosure, the pressurization means is designed as a rocket propellant charge, an acetylene burner with mass feed, a flame spraying device, a galvanic element or a plasma spraying device. The rocket propellant charge can also be referred to as a rocket or a rocket motor.

Preferably, the rocket propellant charge is a solid-state composite propellant charge. These solid-state composite propellants have proven to be particularly advantageous, as they provide a more uniform mass flow over the time of impact and the repeatability is increased, as the tolerances between the individual propellants are very low.

Preferably, the rocket propellant charge can be activated by means of an electric ignition. This is simple and practical and can be realized without great effort.

In an advantageous further development, the galvanic element is designed as a secondary element, also known as an accumulator. The galvanic element comprises at least one cell. The galvanic element is particularly preferably designed as a lithium-ion accumulator. Thanks to such a design of the application means, a test specimen can be tested under quasi-real conditions.

In an advantageous further development, the galvanic element is preferably arranged in such a way that the ground current emerges from the galvanic element against the force of gravity. This offers the advantage that, in contrast to a suspended arrangement, no or hardly any flammable liquid electrolyte can escape from the galvanic element in such an upright arrangement, thus counteracting uncontrolled combustion or even deflagration.

In an advantageous further development, the test device and/or the determination device has a data acquisition device. This can be designed as a computer, for example. The data acquisition device is preferably electrically connected to at least one of the aforementioned measuring devices or all of the aforementioned measuring devices and is set up to record the measuring signals of the measuring device.

In an advantageous further development, a shielding means and/or a steering device is arranged between the loading means and the receiving section.

Thanks to a shielding means arranged in this way, it can be ensured that the impact means is not damaged or destroyed by the reflection of the ground current, particularly if the distance between the impact means and the test specimen is small. The shielding means is preferably made of a high-temperature-resistant and thermal shock-resistant material, preferably fiber composite ceramic.

This shielding means can preferably be designed as a perforated screen with a hole through which the mass flow can pass. Preferably, the orifice plate is mounted directly on the pressurization means so that the hole corresponds to the nozzle of the pressurization means. Alternatively, the shielding means can be arranged at a distance from the impact means. In this case, the hole is dimensioned in such a way that the mass flow can flow unhindered. In a particularly advantageous further development, the mass flow hits the test specimen at an angle, i.e. with a slight inclination, so that the majority of the reflection of the mass flow hits the shielding means and the impact means is even better protected.

Thanks to such a steering device, the mass flow can be steered accordingly in its propagation. The steering device is preferably arranged between the impact means and the test specimen, in particular the steering device is arranged on the side of the test specimen facing the impact means in the impact section. It may be provided that the steering device is fixed to the test specimen, for example by means of fixing means such as screws. It has been shown that the design of the steering device as a pyramid or wedge is particularly advantageous. Thanks to such a design of the steering device, a so-called thermal runaway of a lithium-ion battery can be simulated more realistically than in the prior art. In such a thermal runaway, there is a rapid and massive ejection of metallic battery components, which lead to the formation of a pyramid-shaped deposit and thus deflect the fast, hot gases accordingly. This represents a completely different emission characteristic than a vertically impinging jet. This means that the steering device described can be used to simulate very real conditions using the test device according to the disclosure.

By changing the angle of the steering device, the damage intensity can be adjusted and set, whereby at an angle of 45° the main intensity of the mass flow is derived parallel to the test specimen surface. Angles between 30° and 45° between the beam direction and the surface normal of the steering device are advantageous.

In an advantageous further development, the steering device is made of a ceramic material or of a metallic material, in particular steel, or comprises such a material.

Preferably, the steering device is designed as a wedge, whereby this has two surfaces that conduct the mass flow, whereby the angle of one surface to the test specimen surface is equal or unequal to the angle of the second surface to the test specimen surface. This allows the conditions prevailing in reality to be simulated even more accurately on the test device.

Preferably, the test device is suitable for carrying out the previously described method according to the disclosure for testing a test specimen and further embodiments thereof, whereby the test device can preferably also have the previously mentioned further embodiments.

It should be noted that the features of the specified further developments and advantageous embodiments can be freely combined with one another within the limits of what is technically possible, even if this is not explicitly stated in the text. This also applies in particular beyond the limits of the claim categories device and method.

BRIEF DESCRIPTION OF THE DRAWINGS

Further advantages and features of the method according to the disclosure and the test device according to the disclosure are shown in the following embodiments, which are explained in more detail with reference to the figures (Figure=Fig.).

Show in these.

DETAILED DESCRIPTION OF THE DRAWINGS

In the various figures, identical parts are always provided with the same reference symbols and are therefore generally only named or mentioned once.

Figures 1, 2:
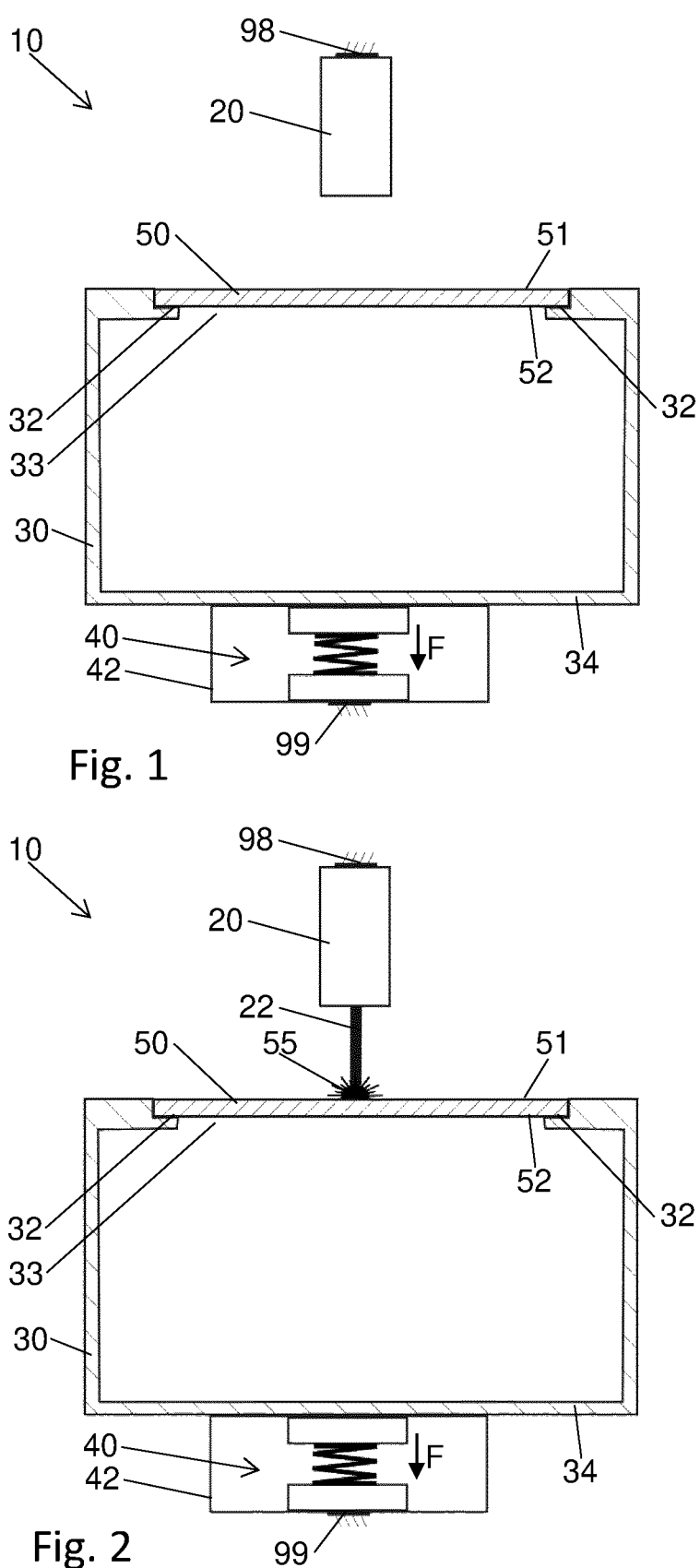
FIG. 1: a schematic representation of a first embodiment of a test device according to the disclosure before a test specimen is subjected to a thermal high-speed mass flow.
FIG. 2: a schematic representation of the first embodiment of the test device according to the disclosure during the application of the high-speed thermal mass flow to the test specimen.
Figure 3:
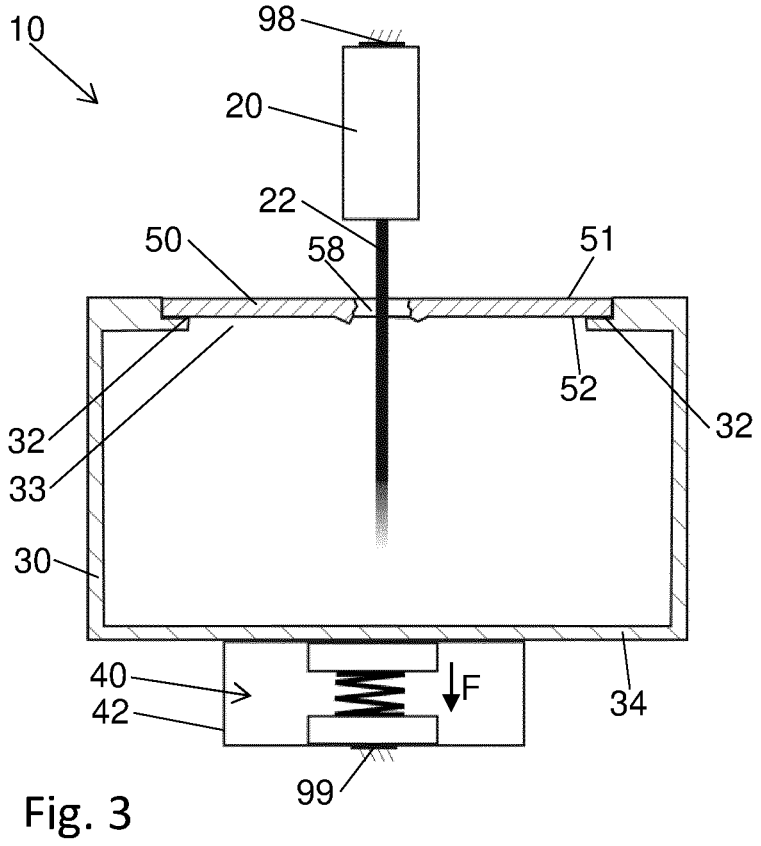
FIG. 3: a schematic representation of the first embodiment of the test device according to the disclosure after the test specimen has been burned through, FIG. 4a: a schematic representation of a force-time diagram with a force-time curve resulting from a performance of a method according to the disclosure.

FIGS. 1 to 3 show a first embodiment of the test device 10 according to the disclosure. The test device 10 is used for testing a test specimen 50 according to the method according to the disclosure. The test device 10 has a holder 30 having a receiving section 32, in which the test specimen 50 is directly received. A loading means 20 designed as a rocket motor is held on a fixed, non-displaceable first bearing 98, which is shown here schematically as a clamp. In FIG. 1, the loading means 20 is not yet ignited and thus the test device is shown in this FIG. 1 before the test specimen 50 is loaded by a high-speed thermal mass flow 22. The high-speed thermal mass flow is referred to as mass flow for short below. The application means 20 is directed towards the test specimen 50 in such a way that the mass flow 22 strikes the test specimen 50, as can be seen in FIG. 2.

Furthermore, the test device 10 has a force measuring device 40 which is operatively coupled to the holder 30. This force measuring device 40 is designed as a load cell and is accommodated in an encapsulated housing 42. The force measuring device 40 is held on a non-displaceable second bearing 99 so that the force F introduced into the test specimen 50 by the mass flow can be determined. In the first embodiment example of the test device 10 shown in FIGS. 1 to 3, the plate-shaped test specimen 50 is held directly in the holding section 32. For this purpose, the receiving section 32 is designed as an edge section of the holder 30 delimiting a recess 33, the edge section being stepped so that the test specimen 50 can be securely inserted there and at the same time support of the test specimen 50 is ensured when the latter is acted upon by the mass flow 22, as shown in FIG. 2, so that the force flow from the test specimen 50 is introduced into the holder 30 via the receiving section 32 and the holder 30 further transmits the force flow to the force measuring device 40. The test specimen 50 has a front side 51 and a rear side 52, with the front side 51 facing the application means 20 and the rear side 52 facing away from the application means 52. The test specimen 50 rests with an edge section of the rear side 52 on the receiving section 32, whereby the largest area of the rear side 52 has no contact with the receiving section 32, i.e. is contact-free.

The mounting 30 is schematized here as a pot-shaped component, preferably made of steel, which has a base section 34 with which the mounting 30 stands on the force measuring device 40 and is thus operatively coupled to it, so that the flow of force from the mounting 30 to the force measuring device 40 is ensured.

FIG. 2 shows the test device of FIG. 1 during the application of the mass flow 22 to the test specimen 50. The mass flow 22 is provided by the supply means 20, which is designed here as a rocket motor with a solid-state composite propellant charge and is also referred to as the loading means, after its electrical ignition over a flow duration that is predetermined by the nature of the supply means 20. The supply means 20 is directed towards the test specimen 50 so that the mass flow 22 strikes the test specimen 50 in an impact section 55 of the front side 51 and introduces heat and a force F into it. The impact section 55 can also be referred to as the impact point. The impact means 20 ejects the mass flow 22 and presses it onto the test specimen 50, which introduces the force F via the receiving section 32 into the holder 30, which is coupled to the force measuring device 40 via the base section 34, so that the force F introduced into the test specimen 50 by the mass flow 22 is determined by the force measuring device.

A method according to the disclosure can be used to determine the burn-through resistance of the test specimen 50 over time by means of the determination device, which here comprises a force measuring device. As can be seen in FIG. 2, the test specimen 50 is subjected to the thermal high-speed mass flow 22 and the force F acting on the test specimen 50 as a result of the application is continuously determined by means of the force measuring device 40, so that a time span ts between the start of the application and the occurrence of a force drop based on a burn-through of the test specimen 50 is determined.

FIG. 3 shows the test device 10 according to the disclosure as shown in FIGS. 1 and 2 after burning through the test specimen 50. The result of burning through the test specimen 50 can be seen in FIG. 3. Due to the heat input, the mass flow 22 has burnt through a resulting opening 58 in the test specimen 50. Since the mass flow 22 can now flow through the burnt-through opening 58 of the test specimen 50, no force or only a very small force is applied to the test specimen 50, so that there is a drop in force, which is determined by means of the force measuring device 40. Thus, by means of the method according to the disclosure described, the time span ts between the start of the application of force and the occurrence of a force drop based on the burn-through of the test specimen 50 can be determined. This can best be seen in the force-time diagram in FIG. 4a.

Figure 4A:
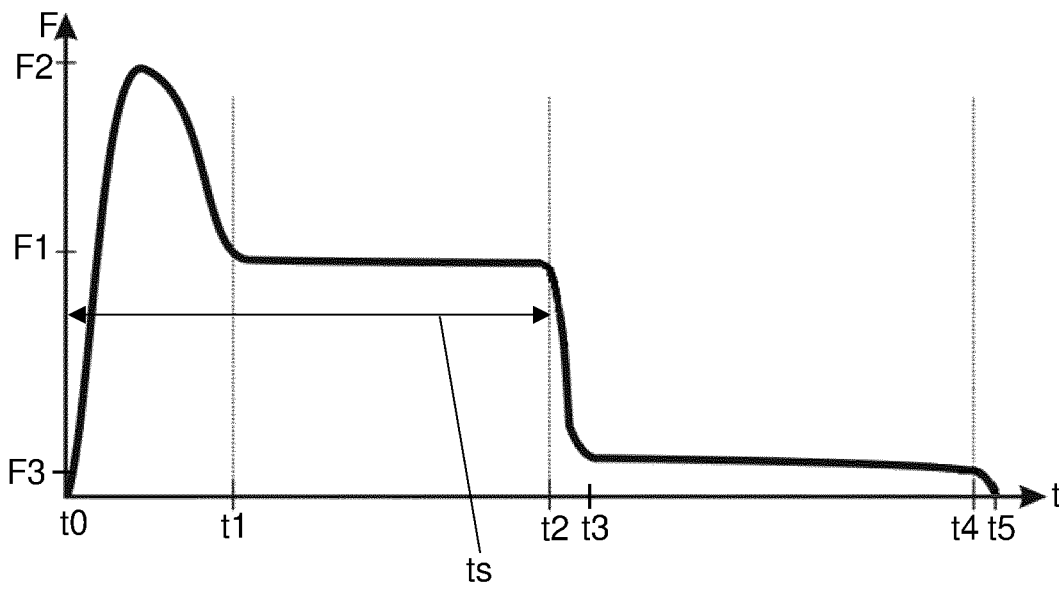
FIG. 4b: a schematic representation of a force-time diagram with a force-time curve in which the test specimen has withstood the load without burning through, FIG. 5: a schematic representation of a second embodiment of a test device according to the disclosure during the application of the thermal high-speed mass flow to a test specimen.

FIG. 4a shows a schematized force-time diagram with a force-time curve, which was determined by means of the method according to the disclosure, for example by one of the test devices according to the disclosure shown in FIGS. 1 to 3 and 5 to 8. The force F applied to the test specimen

50 by the mass flow 22 was determined over the time t. Such a force-time curve can be determined by the force measuring device 40.

At a starting time t0, which represents the beginning of the application of the mass flow 22 to the test specimen 50, there is a sharp increase in force up to a maximum force F2. The force then drops to a force F1, so that the force applied by the mass flow 22 remains relatively constant from time t1 up to time t2. The period between time t0 and t1 shows the start impulse of a loading means 20 designed as a rocket motor. After the start impulse has occurred, the loading means designed as a rocket motor provides a constant mass flow 22, which evenly and continuously introduces heat and force into the test specimen 50, so that from time t1 to time t2 an essentially constant force acts on the test specimen 50. At time t2, the test specimen 50 reaches its burn-through resistance over time, so that it begins to burn through at time t2. Since, as shown for example in FIG. 3, an opening 58 is burned in the test specimen 50 by the mass flow 22 and this can therefore flow through the opening 58 of the test specimen 50 and therefore no force or only a very low force is introduced into the test specimen 50, there is therefore a quasi abrupt drop in force from the force F1 to a force F3 from the onset of burn-through, which corresponds to time t2. The drop in force to the force level of force F3 ends at time t3, when the burn-through of the test specimen has ended. In other words, the time t2 of the burn-through is determined by the force jump between the force level (force plateau) with the force F1 and the force level (force plateau) with the force F3. Thus, the time span ts can be determined as a measure of the burn-through resistance over time between the start of the loading to and the occurrence of a force drop based on a burn-through of the test specimen 50 at time t2. Thus, the burn-through resistance over time, i.e. the time span ts, can be determined by means of the method according to the disclosure. Since the mass flow 22 continues to flow for a certain time after burn-through and flows past the edge of the opening 58, a small force F3 is therefore also introduced into the test specimen 50 after burn-through. The following relationship applies: F2>F1>F3>0. From a point in time t4, the force F3 drops to a value of 0 at time t5, as the propellant (fuel), which is running low, causes the so-called burn-out of the impact means 20, which is designed as a rocket motor.

Figure 4B:
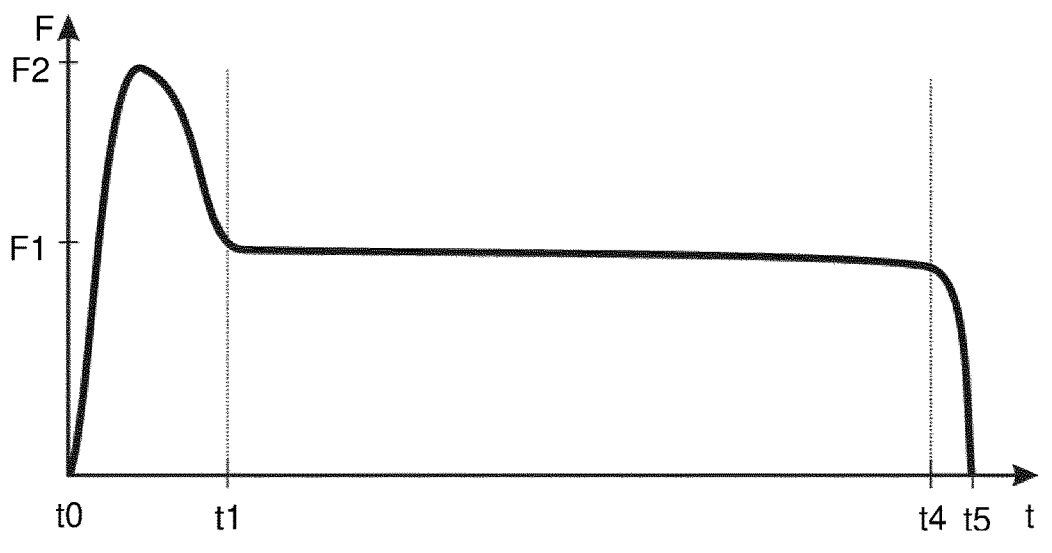

FIG. 4b shows a schematized force-time diagram with a force-time curve which was determined by one of the test devices according to the disclosure shown in FIGS. 1 to 3 and 5 to 8. The force F applied to the test specimen 50 by the mass flow 22 was determined over the time t, whereby in this case the test specimen 50 did not burn through, but resisted the impact of the mass flow 20. Such a force-time curve can be determined by the force measuring device 40.

At a starting time t0, which represents the beginning of the application of the mass flow 22 to the test specimen 50, there is a sharp increase in force up to a maximum force F2. The force then drops to a force F1, so that the force applied by the mass flow 22 remains relatively constant from time t1 up to time t4. The period between the time t0 and t1 shows the start impulse of a loading means 20 designed as a rocket motor. After the start impulse has occurred, the loading means designed as a rocket motor provides a constant mass flow 22, which evenly and continuously introduces heat and force into the test specimen 50, so that from the time t1 to the time t4 an essentially constant force acts on the test specimen 50. From time t4, the force drops from force F1 to a value of 0 at time t5, as the propellant, which is designed as a rocket motor, burns out due to the fuel running out. In contrast to the force curve in FIG. 4a, the test specimen 50 did not burn out, so that no drop in force from F1 to a force F3>0 can be seen due to the burnout. The test specimen 50 survived the entire time of loading (t0 to t5) without burning through. This means that the time period ts>t5−t0.

Figure 5:
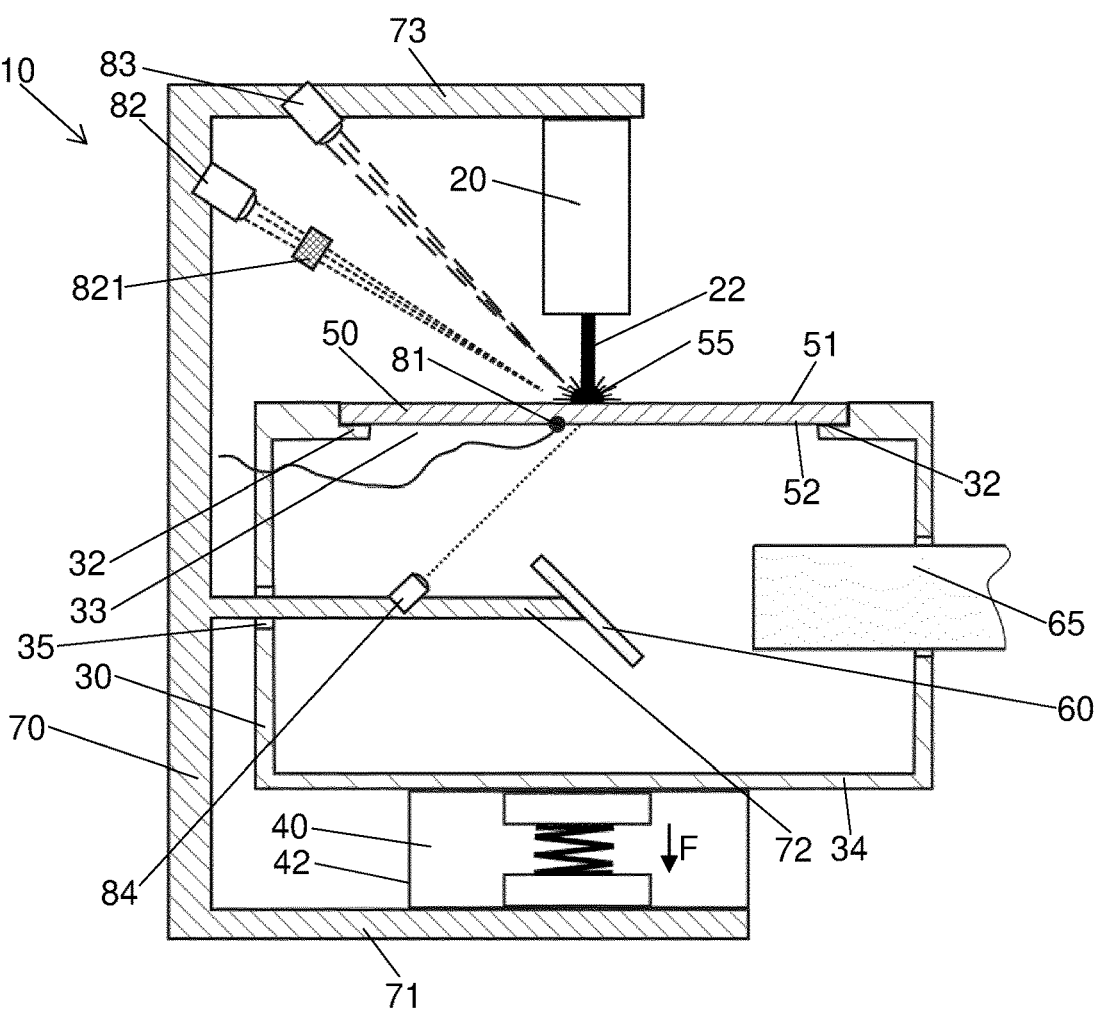
Figure 6:
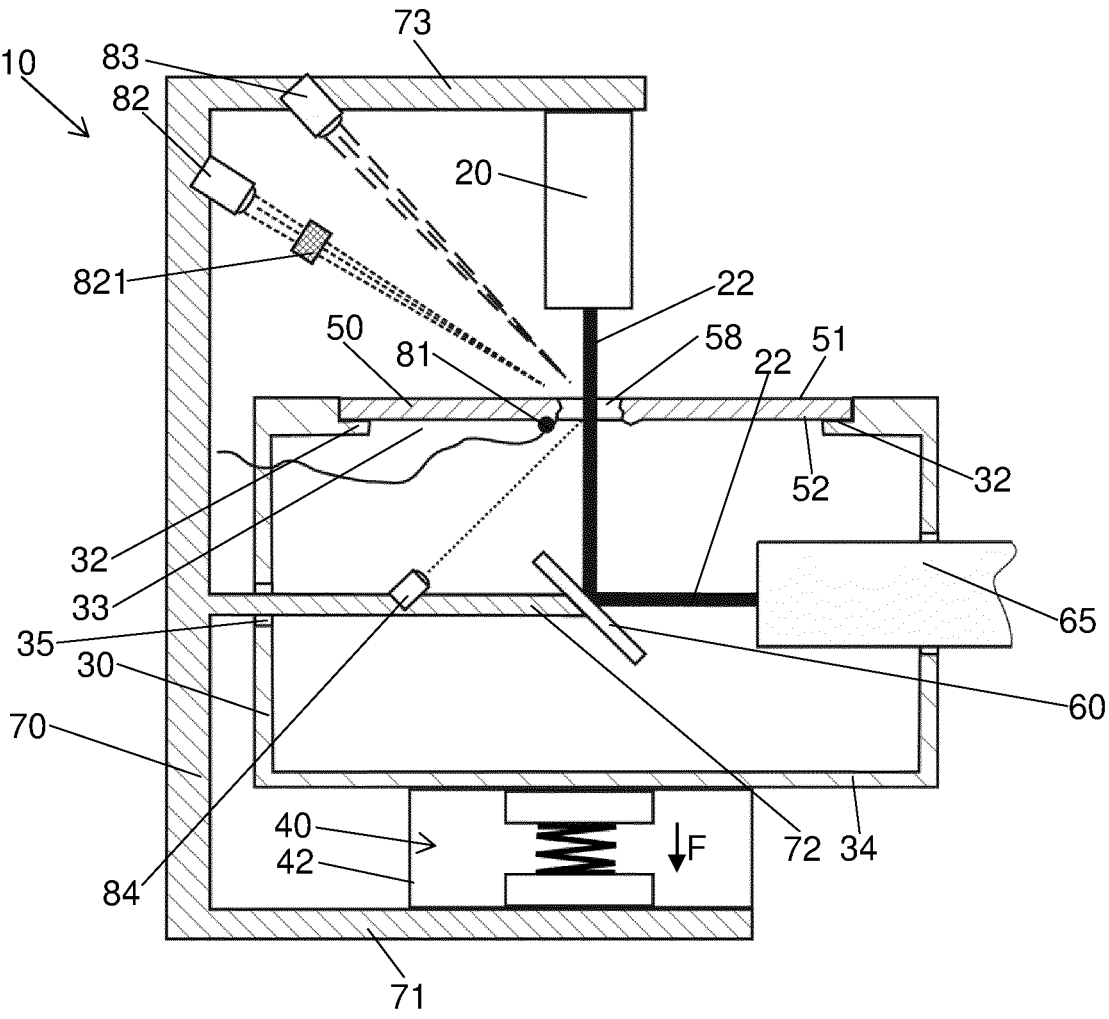
FIG. 6: a schematic representation of the second embodiment of the test device according to the disclosure after the test specimen has been burned through, FIG. 7: a schematic representation of a third embodiment of a test device according to the disclosure during the application of the thermal high-speed mass flow to a test specimen, FIG. 8 schematic representation of a fourth embodiment of a test device according to the disclosure during the application of the thermal high-speed mass flow to a test specimen.

FIGS. 5 and 6 show a schematic diagram of a second embodiment of a test device 10 according to the disclosure, with FIG. 5 showing it during the application of the thermal high-speed mass flow 22 to a test specimen 50 and FIG. 6 showing it after the test specimen has been burned through.

The structure of the second embodiment example is based on the test device 10 of the first embodiment example, whereby the loading means 20, the force measuring device 40 and the receiving section 32 of the holder 30 as well as the test specimen 50 shown correspond to that of the first test device 10 of the first embodiment example and are therefore not repeated in order to avoid redundancies.

All the features described with respect to the aforementioned similar components can be transferred.

In this embodiment, the load-bearing means 20 is not supported on a clamping device, but on a bearing beam 73 of a bracket 70. The bracket 70 can also be referred to as a frame or support unit. The force measuring device 40 is also mounted on the bracket 70 and is supported on it, specifically on the bearing foot 71 of the bracket 70.

The holder 30 is schematized as a pot-shaped component, whereby this has a base section 34, with which the holder 30 stands on the force measuring device 40 of the determining device and is thus operatively coupled to this, so that the force flow from the holder 30 to the force measuring device 40 is ensured. The holder 30 can thus move at least to a small extent relative to the bracket 70, so that the force F introduced into the test specimen 50 by the mass flow 22 can be determined. In an embodiment not shown, a guide device can be provided between the bracket and the holder so that the holder is guided so that it can move in one direction.

A baffle plate 60 is disposed within the bracket 30 and is disposed at one end of a support arm 72 of the bracket 70. The support arm 72 extends through a hole-like recess 35 in a side wall of the bracket 30, with the support arm 72 projecting through the hole-like recess 35 with play, so that force decoupling of the baffle plate 60 relative to the bracket 30 and thus to the force measuring device 40 is ensured. The baffle plate 60 is inclined relative to the front side 51 of the test specimen 50, i.e. arranged at an angle, so that the mass flow 22 flowing through the opening 58 of the test specimen 50 in the event of a burn-through is directed in the direction of an extraction system, as can be clearly seen in FIG. 6. The inclination of the baffle plate is preferably between 30° and 60° relative to the front side 51 of the test specimen 50. The intake nozzle 65 of the extraction system is indicated here in schematic form. This intake nozzle 65 is guided through a further recess in the other side wall of the holder 30.

An infrared camera 84 is arranged on the support arm 72, which is directed towards the rear side 52 of the test specimen 50 and records a thermographic image of its rear side 52 while the test specimen 50 is exposed to the mass flow 22. The infrared camera 84 is attached to the support arm 72 so that its orientation can be adjusted. The infrared camera 84 forms part of the determination device.

Furthermore, a temperature measuring device 81 is arranged on the rear side 52 of the test specimen 50 in the vicinity of the impact section 55. The temperature measuring device 81 is designed as a thermocouple and is bonded to the rear side 52 of the test specimen.

A first high-speed camera 82 with an optical filter 821 and a second high-speed camera 83, each of which is adjustable in its orientation, are attached to the console 70. The high-speed cameras 82, 83 form part of the determination device. The first high-speed camera 82 is directed towards the incident section 55 of the mass flow 22. The second high-speed camera 83 is directed at the mass flow 22 and its impact section 55 and the test specimen 50. However, this can also be aligned so that the impact means 20 is also recorded. The two high-speed cameras record a movie of the impact.

Figure 7:
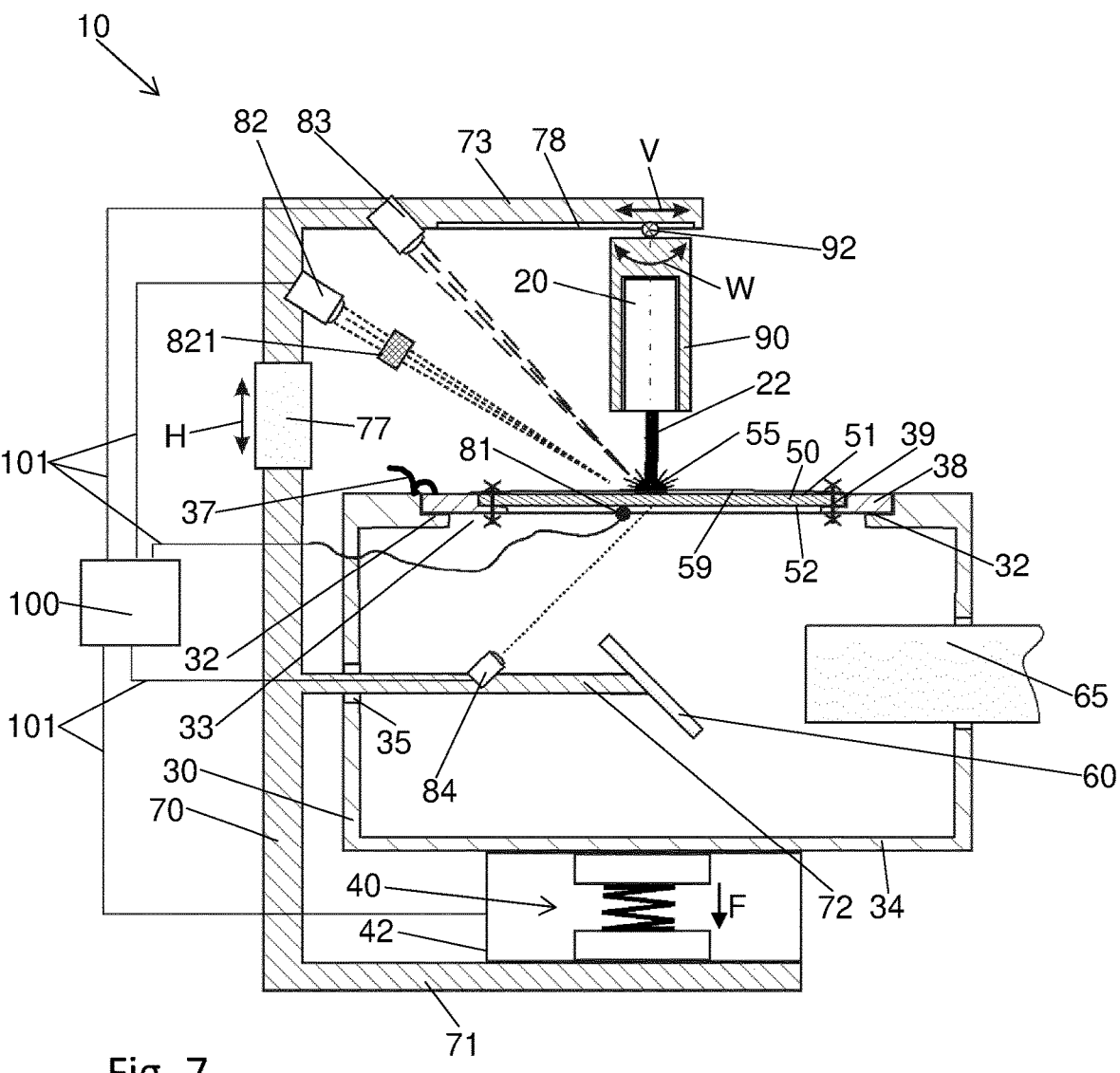

FIG. 7 shows a schematic diagram of a third embodiment of a test device 10 according to the disclosure, showing it during the application of the high-speed thermal mass flow 22 to a test specimen 50.

The structure of the third embodiment example is based on the test device 10 of the second embodiment example, whereby the loading means 20, the force measuring device 40 and the receiving section 32 of the holder 30 correspond to those of the second embodiment example and are therefore not repeated in order to avoid redundancies. All the features described with regard to the similar components mentioned can be transferred.

The structure of the bracket 70 and its functions are similar to the bracket 70 of the second embodiment example in FIGS. 5 and 6, wherein the bearing beam 73, which carries the loading means 20, is adjustable in a height direction H by means of a first adjusting device 77. Thus, a distance of the loading means 20 relative to the receiving section 32 and thus relative to the test specimen 50 can be adjusted.

The loading means 20 is accommodated in a blind hole opening of a carrier element 90. The carrier element 90 is designed as a tube that is closed on one side. The carrier element 90 has a locking device, not shown, which fixes the loading means 20 relative to the carrier element 90 so that the loading means 20 is secured against falling out of the carrier element 90.

The carrier element 90 is held pivotably in a pivoting direction W by means of a lockable joint 92 on the bearing beam 73 of the bracket 70, so that the angle of the loading means 20 in relation to the receiving section 32 and thus the test specimen 50 is adjustable, so that it is thereby possible for the mass flow 22 to also impinge at an angle on the front side 51 of the test specimen 50. Preferably, the adjustable angle is between 0° and 60°, particularly preferably between 0° and 45°. An angle of 0° corresponds to a mass flow 22 directed orthogonally onto the receiving section 32 or the test specimen 50, as shown in FIG. 7.

The carrier element 90 is held translationally displaceably in a vertical direction V by means of a second adjusting device 78 on the bearing beam 73 of the bracket 70, so that the carrier element 90 can be adjusted parallel to the receiving section 32 or the test specimen 50, so that, depending on the set angle of the carrier element 90 and the loading means 20 received therein, it can be set in such a way that the mass flow 22 is applied to the receiving section 32 or the test specimen 50. the test specimen 50, so that, depending on the set angle of the carrier element 90 and the loading means 20 accommodated therein, it can be set such that the mass flow 22 is directed onto the receiving section 32 or the test specimen 50, preferably such that the mass flow 22 strikes the center of the test specimen 50.

The first adjustment device 77 can be designed as a manual, electromotive, pneumatic or hydraulic adjustment device. The second adjustment device 78 can also be designed as a manual, electromotive, pneumatic or hydraulic adjustment device.

A first high-speed camera 82 with an optical filter 821 and a second high-speed camera 83, each of which is adjustable in its orientation, are attached to the console 70. The first high-speed camera 82 is directed towards the impact section 55 of the mass flow 22. The second high-speed camera 83 is directed towards the mass flow 22 and its impact section 55 and the test specimen. However, this can also be aligned so that the impact means 20 is also recorded. The two high-speed cameras record a movie of the impact and form part of the determination device for testing the test specimen.

An infrared camera 84 is arranged on the support arm 72 of the console 70, which is constructed and aligned as in the second embodiment example.

A baffle plate 60 is arranged within the holder 30, which is adjustable in position and angular orientation at one end of the support arm 72 of the bracket 70. The support arm 72 extends through a hole-like recess in a side wall of the bracket 30, so that the latter is decoupled from the bracket 30 in terms of force. The baffle plate 60 is inclined relative to the front side 51 of the test specimen 50 so that the mass flow 22 flowing through an opening of the test specimen 50 in the event of a burn-through is directed in the direction of an extraction system. The inclination of the baffle plate can preferably be adjusted between 30° and 60° in relation to the front 51 of the test specimen 50. The intake nozzle 65 of the extraction system is indicated here in schematic form. This intake nozzle 65 is guided through a further recess in the other side wall of the holder 30.

Furthermore, a temperature measuring device 81 is arranged on the rear side 52 of the test specimen 50 in the vicinity of the impact section 55. The temperature measuring device 81 is designed as a thermocouple and is bonded to the rear side 52 of the test specimen.

In contrast to the first two embodiments, the test specimen 50 is not received directly in the receiving section 32 of the holder 30, but indirectly. For this purpose, a test specimen holder 38 is provided, in which the test specimen 50 is received, wherein the test specimen holder 38 is received in the receiving section 32. The test specimen holder 38 preferably has a mesh grid 59, which is laid over the test specimen 50 in a plane-like manner. The test specimen 50 is thus held securely on the test specimen holder 38. The test specimen holder 38 has a frame-like design so that the test specimen 50 can be inserted therein.

A first fixing device 37 is provided for fixing the test specimen holder 38 in the receiving section 32 and is designed here as a clamping lever. This fixing device 37 can be switched between a fixing position and a release position, so that in the fixing position the test specimen holder 38 is fixed relative to the receiving section 32 and in the release position the test specimen holder 38 can be received in or removed from the receiving section 32.

Furthermore, a second fixing device 39 is provided for fixing the test specimen 50 to the test specimen holder 38, which are designed as screw elements and are indicated schematically.

Furthermore, the test device 10 has a data acquisition device 100, which is designed as a computer and can also be referred to as a measuring computer. The data acquisition device 100 is electrically connected to all of the aforementioned measuring devices and is set up to record the measuring signals of the measuring device. In other words, the data acquisition device 100 is connected to the force measuring device 40, the temperature measuring unit 81, the first high-speed camera 82, the second high-speed camera 83 and the infrared camera 84 via a data line 101. This can be designed as a data bus.

In an embodiment not shown, it is also conceivable and possible that the first and second adjustment devices 77, 78 each have a position sensor and/or are controlled by the data acquisition device in the case of a non-manual design.

Furthermore, it may be provided that the data acquisition device 100 is used for the electrical ignition of the impact means 20 and thus the recording of the measurement results is started.

Figure 8:
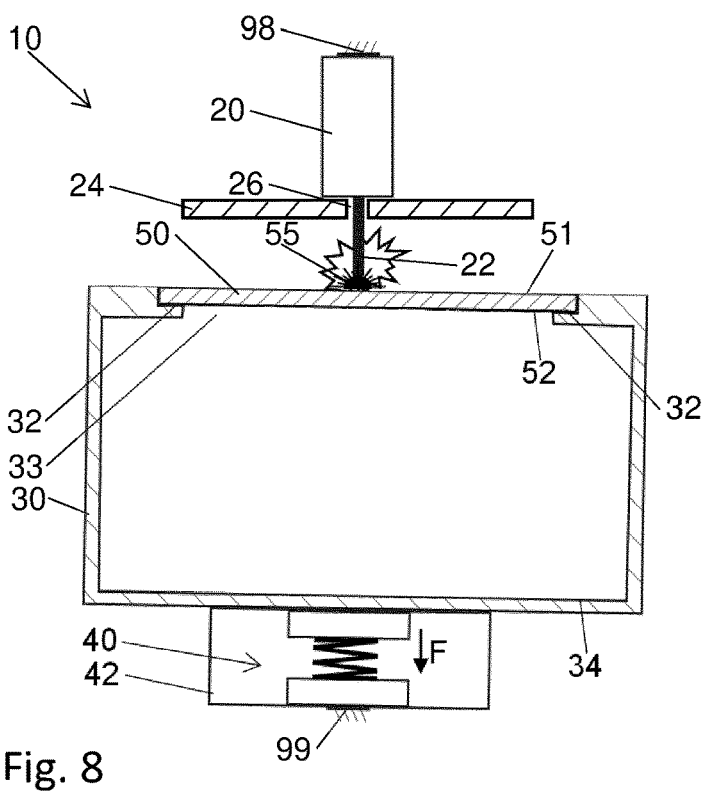

FIG. 8 shows a fourth embodiment of a test device 10 according to the disclosure during the application of the high-speed thermal mass flow 22 to a test specimen 50.

This fourth embodiment example largely corresponds to the first embodiment example shown in FIGS. 1 to 3, but this has been supplemented with a shielding means 24 in the form of a perforated aperture, which is arranged between the application means 20 and the receiving section 32. Furthermore, in contrast to the first embodiment example, the mass flow 22 does not hit the test specimen 50 exactly vertically, as the holder 30 is slightly inclined. As a result, the majority of the reflection of the mass flow 22 hits the shielding means 24 and the exposure means 20 is sufficiently well protected against damage. The shielding means 24, which is designed as a perforated aperture 24, is made of a material that is resistant to high temperatures and thermal shock. The shielding means 24 has a hole 26 through which the ground flow 22 can pass. The shielding means 24, designed as a perforated orifice, is mounted directly on the pressurization means 20, so that the hole 26 corresponds to the nozzle of the pressurization means 20. In an alternative embodiment not shown, the shielding means can be arranged at a distance from the impact means. In this case, the hole is dimensioned in such a way that the mass flow can flow unhindered. All other aspects of the test device 10 of the fourth embodiment example correspond to those of the first embodiment example and are not repeated here in order to avoid redundancies.

Figure 9:
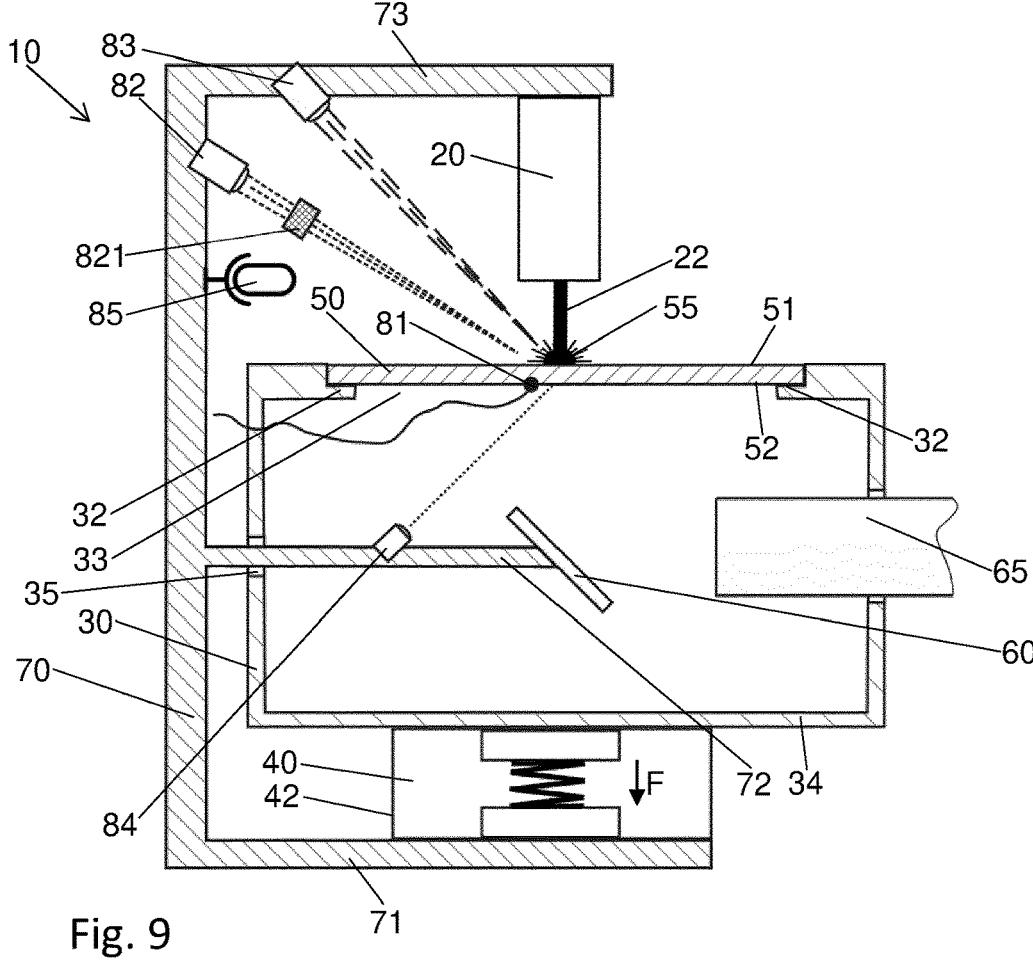
FIG. 9: a schematic representation of a fifth embodiment of a test device according to the disclosure during the application of the thermal high-speed mass flow to a test specimen.

FIG. 9 shows a schematic representation of a fifth embodiment of a test device according to the disclosure during the application of the thermal high-speed mass flow to a test specimen.

The structure of the fifth embodiment example is based on the test device 10 of the second embodiment example, the only difference being that the fifth embodiment example of FIG. 9 comprises an acoustic measuring device 85, which is designed as a microphone. By means of the acoustic measuring device 85, it is possible to make a recording during the application of the mass flow 22 to the test specimen 50, so that additional information about the course of the application can be determined. For example, the acoustic measuring device 85 can be used to precisely determine the time to of the ignition of the impact medium 20. Furthermore, the time at which the test specimen 50 burns through can also be determined by the acoustic measuring device. The acoustic measuring device is therefore part of the determination device. This provides redundancy to the other measuring devices such as the force measuring device and the cameras, which are also based on a different measuring principle. Furthermore, the acoustic measuring device offers the advantage that, unlike the cameras, its measuring properties are not impaired by the development of smoke during exposure. The acoustic measuring device could also form the determining device without the other measuring devices. In other words, the acoustic measuring device alone can be used to determine the burn-through resistance of the test specimen over time.

All other described features of the second embodiment example of FIG. 5 can be transferred without restriction to the fifth embodiment example of FIG. 9.

Figure 10:
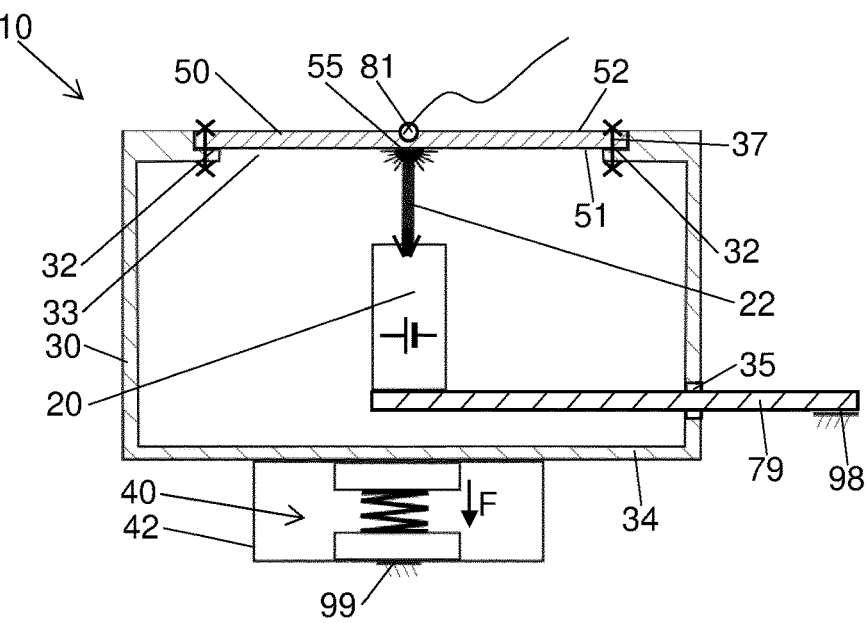
FIG. 10: a schematic representation of a sixth embodiment of a test device according to the disclosure during the application of the high-speed thermal mass flow to a test specimen.

FIG. 10 shows a schematic representation of a sixth embodiment of a test device 10 according to the disclosure during the application of the high-speed thermal mass flow 22 to a test specimen 50.

The test device 10 has a holder 30 with a receiving section 32, in which the test specimen 50 is directly received. The receiving section 32 is designed as an edge section of the holder 30 delimiting a recess 33, whereby the edge section is stepped so that the test specimen 50 can be securely inserted there. The loading means 20, which is designed here as a galvanic element, namely as a lithium-ion accumulator, is held on a fixed, non-displaceable first bearing 98, which is shown here schematically as a holding support 79 fixed to a clamping device. The retaining support 79 extends through a hole-like recess 35 in a side wall of the holder 30, whereby the retaining support 79 projects through the hole-like recess 35 with play, so that a force-related decoupling of the loading means 20 with respect to the holder 30 and thus with respect to the force measuring device 40 is ensured.

The mass flow 22 is provided by the impact means 20. The impact means 20 is directed towards the test specimen 50 so that the mass flow 22 strikes the test specimen 50 in an impact section 55 of the front side 51 and introduces heat and a force F into it. The impact section 55 can also be referred to as the impact point. The impact means 20 ejects the mass flow 22 and presses it onto the test specimen 50, which introduces the force F via the fixing device 37, which is designed as a screw, and the receiving section 32 into the holder 30, which is coupled to the force measuring device 40 via the base section 34, so that the force F introduced into the test specimen 50 by the mass flow 22 is determined by the force measuring device.

A method according to the disclosure can be used to determine the burn-through resistance of the test specimen 50 over time. As can be seen in FIG. 10, the test specimen 50 is subjected to the high-speed thermal mass flow 22 from the galvanic element 20 and the force F acting on the test specimen 50 as a result of the application is continuously determined by means of the force measuring device 40, so that a time period ts between the start of the application and the occurrence of a drop in force based on a burn-through of the test specimen 50 is determined. Additionally or alternatively, the determination device can also comprise other or further measuring devices.

The galvanic element 20 is arranged inside the holder 30 in such a way that the ground current 22 flows out of the galvanic element against the force of gravity, i.e. upwards. This offers the advantage that, in contrast to a suspended arrangement, no or hardly any flammable, liquid electrolyte can escape (leak) from the galvanic element 20 in such an upright arrangement, thus counteracting uncontrolled combustion or even deflagration.

The test device 10 has the force measuring device 40 operatively coupled to the holder 30. This force measuring device 40 is accommodated in an encapsulated housing 42. The force measuring device 40 is held on a non-displaceable second bearing 99 so that the force F introduced into the test specimen 50 by the mass flow can be determined.

Furthermore, a temperature measuring device 81 is arranged on the rear side 52 of the test specimen 50 in the vicinity of the impact section 55, so that the temperature of the test specimen 50 can be determined during exposure. The temperature measuring device 81 is designed as a thermocouple.

Figure 11:
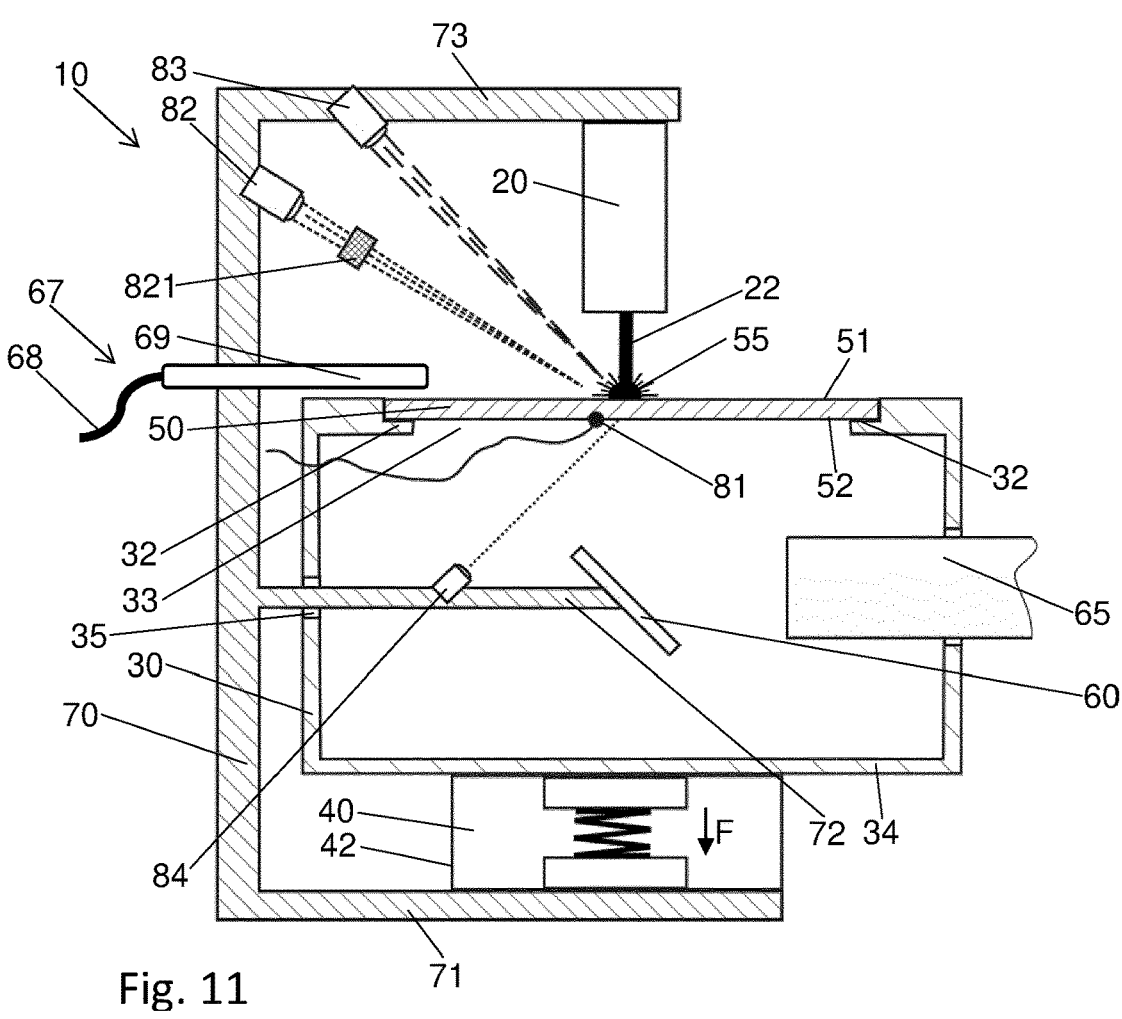
FIG. 11: a schematic representation of a seventh embodiment of a test device according to the disclosure during the application of the high-speed thermal mass flow to a test specimen.

FIG. 11 shows a schematic representation of a seventh embodiment of a test device according to the disclosure during the application of the high-speed thermal mass flow to a test specimen.

The structure of the seventh embodiment example is based on the test device 10 of the second embodiment example, the only difference being that the seventh embodiment example of FIG. 11 comprises a blower device 67. The blower device has a compressed air lance 69, which is fixed in the bracket 70 and which is connected to a compressed air hose 68, which is connected to a compressor not shown. The blower device 67 is set up and arranged in such a way that it moves away the smoke produced during the pressurization by means of an air flow. This offers the advantage that when a high-speed camera is used, the view of the test specimen is kept clear during exposure and is not impaired by smoke. This means that the accuracy of the test specimen test and, in particular, the determination of the burn-through resistance over time can be further improved using the high-speed camera. The fluid flow must be dimensioned in such a way that it has only an insignificant and technically negligible effect on the mass flow during exposure.

All other described features of the second embodiment example of FIG. 5 can be transferred without restriction to the seventh embodiment example of FIG. 11.

Figures 12, 13:
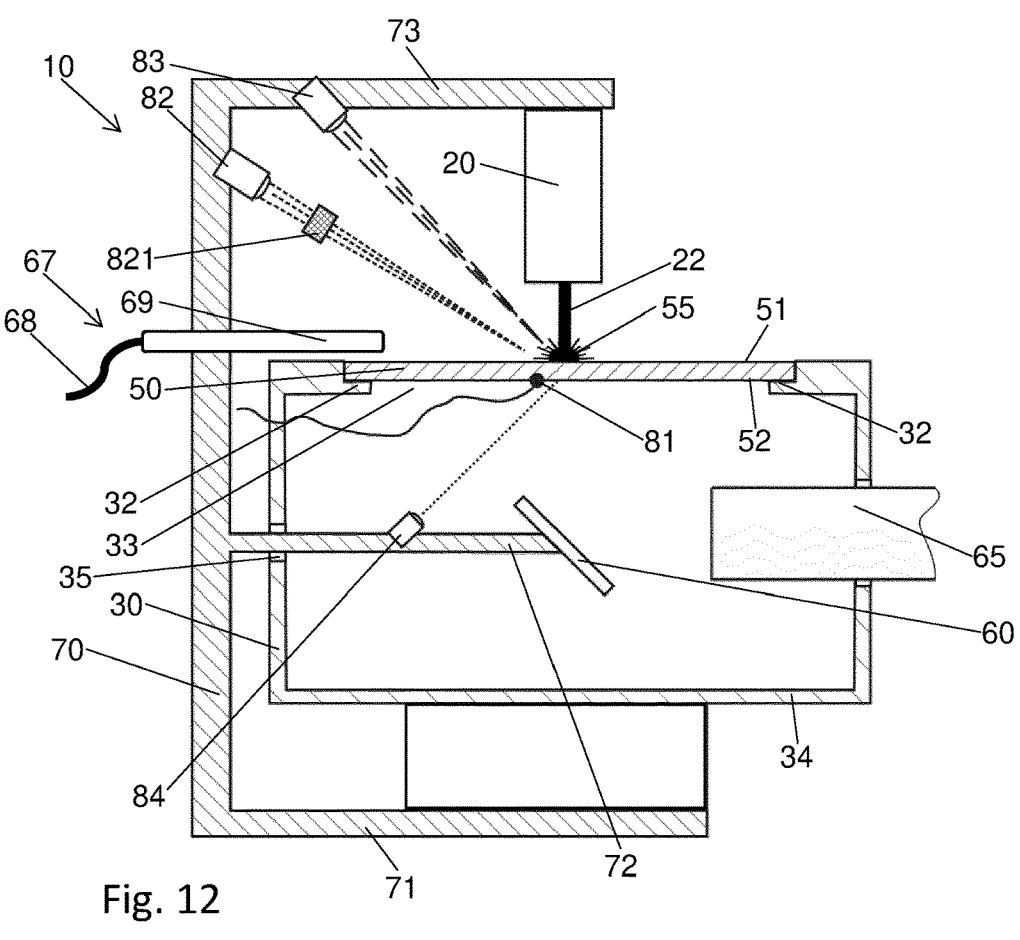
FIG. 12: a schematic representation of an eighth embodiment of a test device according to the disclosure during the application of the high-speed thermal mass flow to a test specimen
FIG. 13: A schematic representation of a ninth embodiment of a test device according to the disclosure during the application of the high-speed thermal mass flow to a test specimen.

FIG. 12 shows a schematic representation of an eighth embodiment of a test device disclosure during the application of the high-speed thermal mass flow to a test specimen.

The structure of the eighth embodiment example is based on the test device 10 of the seventh embodiment example, the only difference being that the eighth embodiment example of FIG. 12 does not include a force measuring device. The determination device for determining the burn-through resistance over time here comprises the high-speed cameras 82 and 83, whereby these determine the time span ts by means of the method according to the disclosure.

All other described features of the seventh embodiment example of FIG. 11 in conjunction with the aspects of the second embodiment example of FIG. 5 can be transferred without restriction to the eighth embodiment example of FIG. 12.

FIG. 13 shows a schematic representation of a ninth embodiment of a test device according to the disclosure during the application of the high-speed thermal mass flow to a test specimen.

The structure of the ninth embodiment example is based on the test device 10 of the first embodiment example, the only difference being that the ninth embodiment example of FIG. 13 comprises a steering device 25.

The mass flow 22 can be steered accordingly by the steering device 25, which is designed as a wedge, as can be clearly seen in FIG. 13. The steering device 25 in the form of a wedge is arranged between the loading means 20 and the test specimen 50, specifically on the side 51 of the test specimen 50 facing the loading means 20. The steering device 25 is fixed to the test specimen by means of screws not shown. The steering device 25 is made of steel. The steering device 25, which is designed as a wedge, has two surfaces that conduct the mass flow, whereby the angle of one surface to the test specimen surface is the same as the angle of the second surface to the test specimen surface. This allows the conditions prevailing in reality to be simulated even more accurately on the test device. When the mass flow 22 hits the steering device 25, this mass flow is essentially halved and diverted to the side accordingly. The steering device acts more or less like a plow. The steering device 25 can be easily integrated into the other embodiments.

Figure 14:
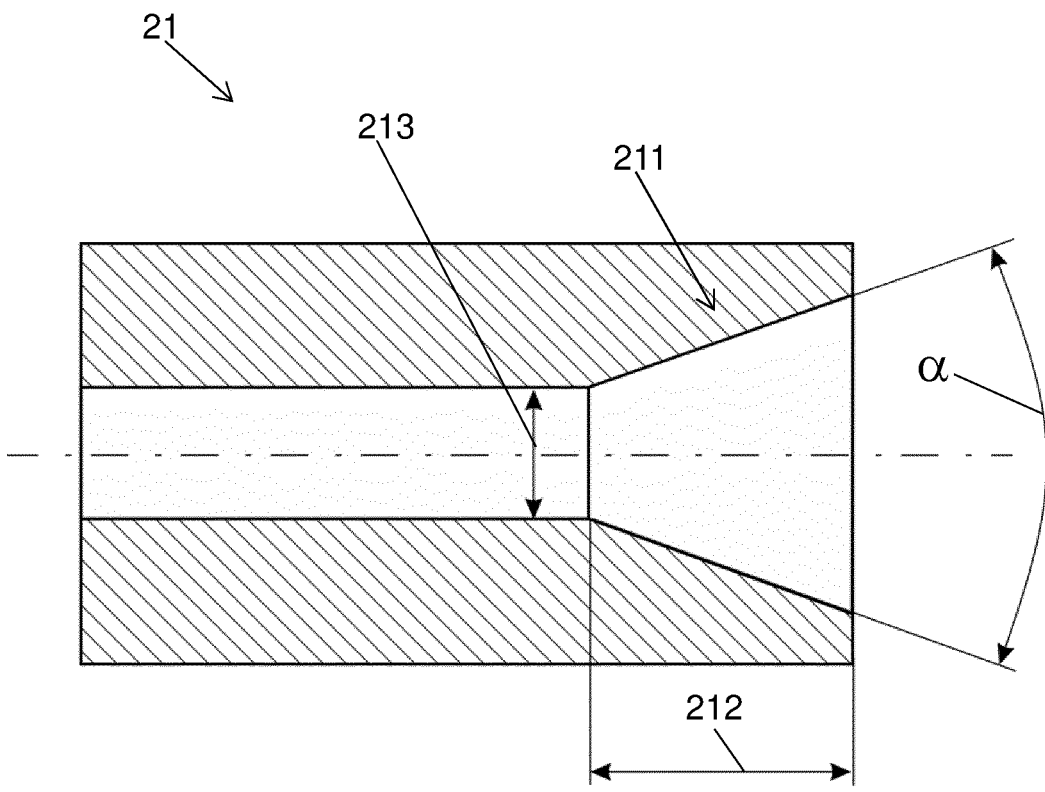
FIG. 14: A schematic sectional view of a nozzle for adjusting the emission characteristics of the mass flow.

FIG. 14 shows a schematic longitudinal section of a nozzle 21. This nozzle 21 can be integrated into all of the previously illustrated embodiments in order to adjust the emission characteristics of the mass flow accordingly. The nozzle 21 has a conical or cone-shaped nozzle outlet channel 211, which has a predetermined length 212 and a predetermined opening cross-section 213 and a predetermined opening angle α. The opening cross-section 213 here represents the inlet cross-section from the supply line into the nozzle outlet channel. Due to the cone angle, the final outlet cross-section can be easily determined by calculation. It may be provided that the wall of the outlet channel is curved, for example convex or concave.

In principle, the measuring devices, cameras and all other advantageous further developments shown in the other embodiments can also be transferred to the test device shown in FIG. 10.

The invention claimed is:

1. A method for thermomechanical testing of a test specimen, including the following steps: subjecting the test specimen to a high-speed thermal mass flow thermal high-speed mass flow, continuously determining a force acting on the test specimen as a result of the exposure by a determination device, and determining a force-time curve therefrom, wherein a test device is provided and includes a holder having a receiving section in which the test specimen is received directly or indirectly and impact means is adjustable relative to the holder and supported on a bracket, wherein an angle and/or a distance of the impact means relative to the holder is adjustable and a carrier element is held pivotably by the bracket such that the test specimen is adjustable.

2. The method according to claim 1, wherein a time period is determined between the start of the loading and the occurrence of a drop in force based on a burn-through of the test specimen.

3. The method according to claim 1, wherein the time of the start of the loading is determined by an increase in force.

4. The method according to claim 1, wherein a temperature of the test specimen is determined, the temperature being determined on the side of the test specimen facing away from the mass flow.

5. The method according to claim 4, wherein the force and/or the temperature are determined in a common data acquisition device.

6. The method according to claim 1, wherein an impulse acting on the test specimen is determined by the force acting over the time period.

7. The method according to claim 1, wherein a thermal photograph and/or a thermograph of the test specimen is recorded and/or an acoustic signal is determined during the exposure and/or the jet velocity of the mass flow is determined.

8. The method according to claim 1, wherein the mass flow is provided by a rocket propellant discharge, an acetylene burner with mass feed, flame spraying, or plasma spraying.

9. A test device for thermomechanical testing of a test specimen, comprising a holder having a receiving section, in which the test specimen is received directly or indirectly, and a pressurizing means for providing a high speed thermal mass flow which is directed onto the test specimen wherein the test device has a determination device which comprises a force measuring device which is operatively coupled to the holder and is set up to determine the force introduced into the test specimen by the mass flow in order to determine a force-time curve, wherein impact means is adjustable relative to the holder and supported on a bracket, wherein an angle and/or a distance of the impact means relative to the holder is adjustable and a carrier element is held pivotably by the bracket such that the test specimen is adjustable.

10. The test device according to claim 9, wherein the determination device is designed to determine a burn-through resistance of the test specimen.

11. The test device according to claim 9, wherein the determination device has a temperature measuring device for determining the temperature of the test specimen and/or comprises a high-speed camera and/or an infrared camera and/or an acoustic measuring device.

12. The test device according to claim 9, wherein impingement means is designed as a rocket propellant charge, an acetylene burner with mass feed, a flame spraying device, a galvanic element, or a plasma spraying device.

13. The test device according to claim 9, wherein a shielding means and/or a steering device is arranged between loading means and the receiving section.

14. The test device for carrying out a method for testing a test specimen including the following steps: subjecting the test specimen to a high-speed thermal mass flow thermal high-speed mass flow, continuously determining a force acting on the test specimen as a result of the exposure by a determination device, and determining a force-time curve therefrom, wherein the test device is designed according to claim 9.

15. A method for thermomechanical testing of a test specimen, the method including the following steps:

subjecting the test specimen to a high-speed thermal mass flow, continuously determining a force acting on the test specimen as a result of an exposure by a determination device, determining a time interval between a start of the exposure and an occurrence of a force drop based on a burn-through of the test specimen, and determining a burn-through resistance of the test specimen over the time interval, wherein a test device is provided and includes a holder having a receiving section in which the test specimen is received directly or indirectly and impact means is adjustable relative to the holder and supported on a bracket, wherein an angle and/or a distance of the impact means relative to the holder is adjustable and a carrier element is held pivotably by the bracket such that the test specimen is adjustable.

\* \* \* \* \*